US009424602B2

(12) United States Patent
Taniguchi et al.

(10) Patent No.: US 9,424,602 B2
(45) Date of Patent: Aug. 23, 2016

(54) ORDER RECEIVING SYSTEM AND ORDER RECEIVING METHOD

(71) Applicant: PANASONIC CORPORATION, Osaka (JP)

(72) Inventors: Shouhei Taniguchi, Kanagawa (JP); Ryosuke Kitago, Fukuoka (JP); Hirotaka Fukutsuka, Fukuoka (JP); Akinobu Tanaka, Fukuoka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 107 days.

(21) Appl. No.: 13/686,064

(22) Filed: Nov. 27, 2012

(65) Prior Publication Data

US 2013/0138515 A1    May 30, 2013

(30) Foreign Application Priority Data

Nov. 30, 2011   (JP) .................................. 2011-261585

(51) Int. Cl.
*G06Q 50/12* (2012.01)
*G06Q 30/06* (2012.01)
*G06Q 30/00* (2012.01)
*G06Q 10/08* (2012.01)

(52) U.S. Cl.
CPC .......... *G06Q 30/0635* (2013.01); *G06Q 10/087* (2013.01); *G06Q 30/00* (2013.01); *G06Q 50/12* (2013.01)

(58) Field of Classification Search
CPC combination set(s) only.
See application file for complete search history.

(56) References Cited

U.S. PATENT DOCUMENTS

| 6,435,406 | B1 | 8/2002 | Pentel |
| 8,583,511 | B2* | 11/2013 | Hendrickson .......... G06Q 30/02 701/2 |
| 2002/0143638 | A1 | 10/2002 | August et al. |
| 2005/0049921 | A1* | 3/2005 | Tengler et al. ................. 705/15 |
| 2005/0201569 | A1* | 9/2005 | Kuraoka et al. ................ 381/74 |
| 2007/0192196 | A1 | 8/2007 | Awiszus |

(Continued)

FOREIGN PATENT DOCUMENTS

| CN | 101114365 | 1/2008 |
| CN | 101504740 | 8/2009 |

(Continued)

OTHER PUBLICATIONS

Office Action issued in Chinese Patent Application No. 201280059100.0, mail date is May 3, 2016, together with English language translation thereof.

*Primary Examiner* — Luna Champagne
(74) *Attorney, Agent, or Firm* — Greenblum & Bernstein, P.L.C.

(57) ABSTRACT

The present invention provides an order receiving system includes an order receiving unit that receives an order for an item from a customer terminal; an information obtaining unit that obtains reference information for determining a condition for starting preparation for provision of the item; a start condition setting unit that sets the condition for starting preparation for provision of the item whose order has been received by the order receiving unit, based on a content of the order and the reference information; and a condition determining unit that determines, after receiving the order for the item by the order receiving unit, whether the condition determined by the start condition setting unit is satisfied. When the condition determining unit determines that the condition is satisfied, the transmitting unit of the wireless center module transmits a preparation start instruction signal to the wireless headset.

18 Claims, 14 Drawing Sheets

(56) References Cited

U.S. PATENT DOCUMENTS

| | | |
|---|---|---|
| 2007/0205278 A1* | 9/2007 | Lovett ............................ 235/383 |
| 2007/0208626 A1 | 9/2007 | Awiszus |
| 2008/0319864 A1* | 12/2008 | Leet ................................. 705/15 |
| 2009/0307096 A1* | 12/2009 | Antonellis ....................... 705/15 |
| 2010/0250374 A1* | 9/2010 | Downes ........................... 705/15 |
| 2011/0153457 A1* | 6/2011 | Hinks ......................... 705/26.81 |
| 2013/0080269 A1 | 3/2013 | Awiszus |

FOREIGN PATENT DOCUMENTS

| | | | |
|---|---|---|---|
| EP | 1248414 | 10/2002 | |
| EP | 1248414 A2 * | 10/2002 | ............. H04L 12/28 |
| JP | 2002-366625 | 12/2002 | |
| WO | 02/29708 | 4/2002 | |
| WO | 2007/094975 | 8/2007 | |
| WO | 2007/094982 | 8/2007 | |

* cited by examiner

Fig.9

| RESTAURANT ORDER || REMOTE ORDER ||
|---|---|---|---|
| ORDER NO. | CONTENTS OF ORDER | ORDER NO. | CONTENTS OF ORDER |
| 21 | HAMBURGER (1) : FRENCH FRIES (1) COFFEE (1) : | 14 | HAMBURGER (4) : FRIED CHICKEN (1) COKE (2) : COFFEE (2) |
| 22 | HAMBURGER (2) : FRENCH FRIES (2) TEA (1) : COFFEE (1) | 15 | HAMBURGER (2) : FRENCH FRIES (2) TEA (1) : COFFEE (1) |
| 23 | HAMBURGER (3) : FRIED CHICKEN (2) COKE (1) : COFFEE (2) | 16 | HAMBURGER (4) : FRENCH FRIES (4) COFFEE (2) : |
| 24 | | 17 | HAMBURGER (3) : FRENCH FRIES (3) ORANGE JUICE (2) : COFFEE (1) |
| 25 | | 18 | |
| 26 | | 19 | |

Fig.10

| RESTAURANT ORDER || REMOTE ORDER ||
|---|---|---|---|
| ORDER NO. | CONTENTS OF ORDER | ORDER NO. | CONTENTS OF ORDER |
| (14) | HAMBURGER (4) : FRIED CHICKEN (1) COKE (2) : COFFEE (2) | 15 | HAMBURGER (2) : FRENCH FRIES (2) TEA (1) : COFFEE (1) |
| 21 | HAMBURGER (1) : FRENCH FRIES (1) COFFEE (1) : | 16 | HAMBURGER (4) : FRENCH FRIES (4) COFFEE (2) : |
| 22 | HAMBURGER (2) : FRENCH FRIES (2) TEA (1) : COFFEE (1) | 17 | HAMBURGER (3) : FRENCH FRIES (3) ORANGE JUICE (2) : COFFEE (1) |
| 23 | HAMBURGER (3) : FRIED CHICKEN (2) COKE (1) : COFFEE (2) | 18 | |
| 25 | | 19 | |
| 26 | | 20 | |

Fig.11

| RESTAURANT ORDER | | REMOTE ORDER | |
|---|---|---|---|
| ORDER NO. | CONTENTS OF ORDER | ORDER NO. | CONTENTS OF ORDER |
| 21 | HAMBURGER (1) : FRENCH FRIES (1) COFFEE (1) : | 14 | HAMBURGER(4):FRIED CHICKEN(1) COKE (2):COFFEE (2) |
| 22 | HAMBURGER (2) : FRENCH FRIES (2) TEA (1) :COFFEE (1) | 15 | HAMBURGER(2):FRENCH FRIES (2) TEA (1):COFFEE (1) |
| 23 | HAMBURGER (3) : FRIED CHICKEN (2) COKE (1):COFFEE (2) | 16 | HAMBURGER(4):FRENCH FRIES(4) COFFEE (2): |
| (14) | HAMBURGER (4) : FRIED CHICKEN (1) COKE (2) : COFFEE (2) | 17 | HAMBURGER(3):FRENCH FRIES(3) ORANGE JUICE(2): COFFEE (1) |
| 24 | | 18 | |
| 25 | | 19 | |

ORDER RECEIVING SYSTEM AND ORDER RECEIVING METHOD

CROSS-REFERENCE TO RELATED APPLICATION

This application claims priority to Japanese Patent Application No. 2011-261585 filed on Nov. 30, 2011, the content of which is incorporated herein by reference.

BACKGROUND OF THE INVENTION

1. Field of the Invention

The present invention relates to an order receiving system and an order receiving method which are used by an item or service provider to receive orders from customers and prepare for and provide items or services according to the orders.

2. Description of the Related Art

Conventionally, restaurants such as quick service restaurant adopt a drive-thru system that allows customers to place an order at a store without getting out of their vehicles and pick up to-go items (food and drinks). The advantage of the drive-thru system is that customers can order items while staying in their vehicles and pick up the items without taking their time to park the vehicles in a parking lot and move to the restaurant, and thus the customers can purchase the items quickly.

Patent Document (JP 2002-366625 A) discloses an order receiving system that receives an order for items beforehand from a customer terminal through a communication network in order to proceed preparation for the provision of to-go items before a customer comes to a store. In this system, orders received from customers are displayed on a display in a store. Information displayed on the display includes expected arrival times of the respective customers, the distances from a vendor transaction facility (i.e., the restaurant) to the customers or the locations of the customers, prediction as to in what order the customers are processed, etc.

However, the above-described Patent Document does not describe at all specifically how to predict the arrival times of the respective customers, in what order the customers are processed, etc.

In addition, when the order receiving system is applied to a service that provides to-go food and drinks, it is, of course, necessary to complete preparation for the provision of items before a customer having placed an order arrives at a store, but too early preparation for the provision of items is not good either. This is because if preparation is too early, hot food and drinks which are items may get cold or cold food and drinks may get warm. Such a thing also applies to facilities that provide services instead of items, and systems that receive reservations beforehand through a communication network so that services can be provided to customers right after their arrival.

SUMMARY OF THE INVENTION

The present invention is made to solve the above-described conventional problems, and an object of the present invention is to provide an order receiving system that receives orders for items or services requiring preparation time for provision, and that is capable of supporting the start of preparation for items or services to be provided, at appropriate timing.

An order receiving system includes a wireless headset having a transmitting and receiving unit; and a wireless base phone having a transmitting unit transmitting various types of signals to the wireless headset, and receives an order for an item requiring preparation time for provision. The order receiving system is configured such that the order receiving system includes: an order receiving unit that receives an order for an item from a customer terminal; an information obtaining unit that obtains reference information for determining a condition for starting preparation for provision of the item whose order has been received by the order receiving unit; a start condition setting unit that sets the condition for starting preparation for provision of the item whose order has been received by the order receiving unit, based on a contents of the order the reference information; and a condition determining unit that determines, after receiving the order for the item by the order receiving unit, whether the condition set by the start condition setting unit is satisfied, and when the condition determining unit determines that the condition is satisfied, the transmitting unit of the wireless base phone transmits a preparation start instruction signal to the wireless headset.

As will be described below, the present invention has other aspects. Therefore, the disclosure of this invention is intended to provide a part of the present invention and is not intended to limit the scope of the invention described and claimed here.

BRIEF DESCRIPTION OF THE DRAWINGS

FIG. 9 is a diagram showing display provided by the order receiving system of the first embodiment of the present invention;

FIG. 10 is a diagram showing display provided by the order receiving system of the first embodiment of the present invention;

FIG. 11 is a diagram showing display provided by the order receiving system of the first embodiment of the present invention;

DETAILED DESCRIPTION OF EMBODIMENTS

Order receiving systems of embodiments of the present invention will be described below along with the drawings. The embodiments described below are merely examples of the present invention and thus the present invention can be modified in various modes. Therefore, specific configurations and functions disclosed below do not limit the claims.

Figure 3:
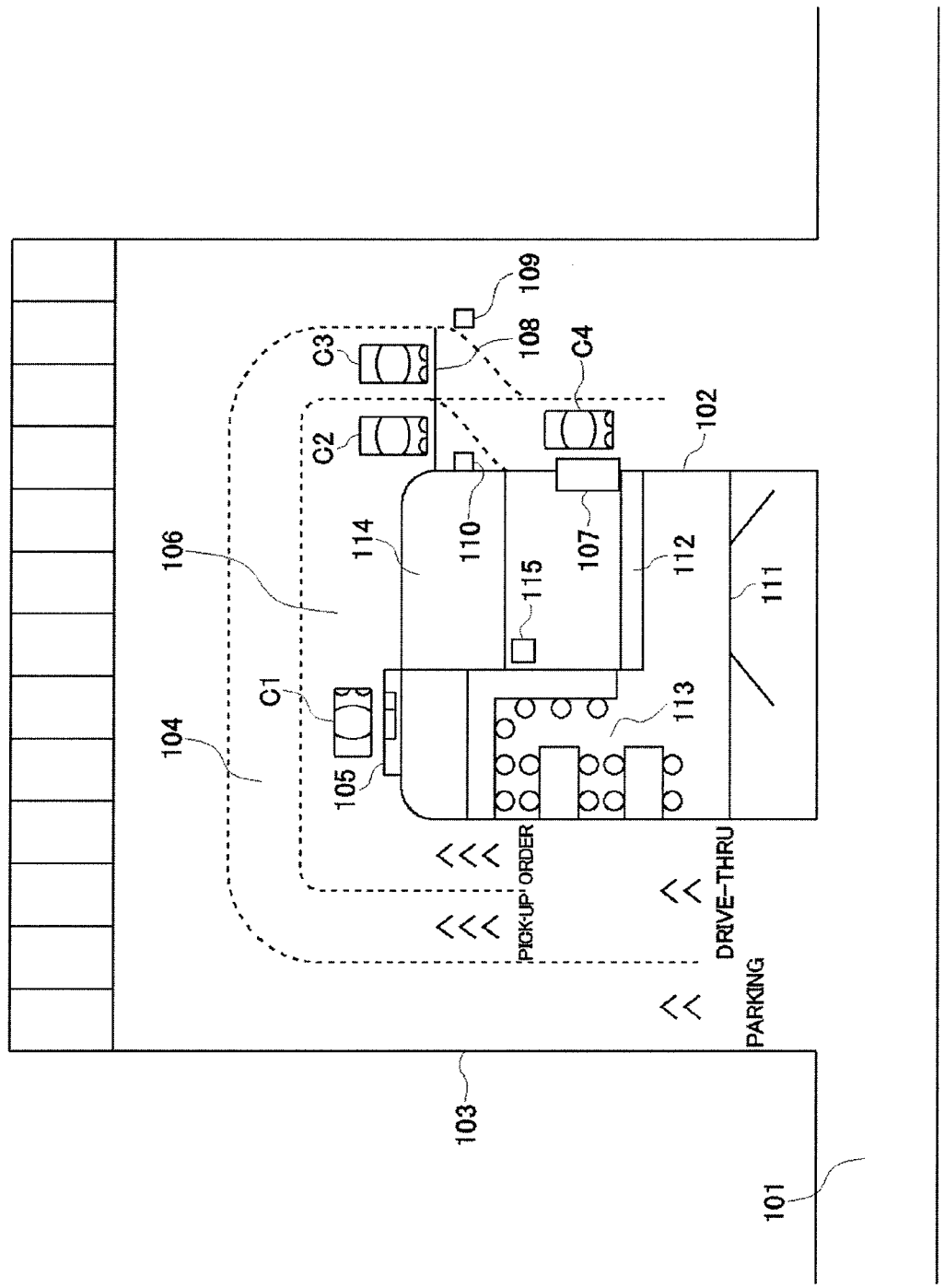
FIG. 3 is a schematic diagram of a facility to which the order receiving system of the embodiments of the present invention is applied.

First, with reference to FIG. 3, a facility to which order receiving systems of embodiments of the present invention are applied will be described. FIG. 3 is a schematic diagram of a facility to which order receiving systems of embodiments of the present invention are applied. In the following, an example in which the order receiving systems are applied to a quick service restaurant will be described.

As shown in FIG. 3, the facility (quick service restaurant) faces a road 101 on which cars can pass. A restaurant 102 is located in the center, on the road side, of a site 103 of the facility, and cars can drive around the restaurant 102 in the site 103. In FIG. 3, the left side of the restaurant 102 is an entrance for vehicles and the right side is an exit for vehicles.

At the entrance for vehicles there are a sign (PARKING>>) leading to a parking lot and a sign (DRIVE-THRU>>) leading to a drive-thru. Ahead of the guidance to the drive-thru, there are a sign (PICK UP>>>) leading to a pick-up lane 104 for customers who have already remotely placed orders using the order receiving system, to only pick up items; and a sign (ORDER>>>) leading customers who are going to place orders now to an order lane 106 where there is a drive-thru ordering system 105.

The pick-up lane 104 and the order lane 106 are formed in parallel with each other to surround the restaurant 102. The drive-thru ordering system 105 is provided midway on the order lane 106, and customers can place orders there while staying in their vehicles. The restaurant 102 is provided with a drive-thru item handover counter 107.

In addition, a stop line 108 is provided for the pick-up lane 104 and the order lane 106, in front of the item handover counter 107. The pick-up lane 104 and the order lane 106 merge into one ahead of the stop line 108, reaching the handover counter 107. In front of the stop line 108 there are provided a pick-up lane signal 109 and an order lane signal 110 which are operated by a staff member at the item handover counter 107.

In the restaurant 102 there are provided a counter 112 at which customers entering from an entrance 111 place orders; and a hall 113 for eating and drinking. At the back of the counter 112 is provided a kitchen 114, and food and drinks which are items are prepared there. In addition, in the restaurant 102, a wireless center module (hereinafter, simply referred to as the "center module") 115 is placed in a location that is the center of a staff members' movement range. Each staff member in the restaurant 102 has a wireless headset (hereinafter, simply referred to as the "headset") which will be described later, and the staff members have audio telephone conversations with each other through the center module 115. In addition, a headset which is not shown is also placed in the kitchen 114.

In such a facility, a drive-thru service is provided as follows. First, a customer passes through the order lane 106 and places an order using the drive-thru system 105, while staying in his/her vehicle. A vehicle C1 in FIG. 3 is a vehicle placing an order using the drive-thru system 105. When the customer completes the order, he/she moves the vehicle forward and stops the vehicle at the stop line 108. A vehicle C2 in FIG. 3 is a vehicle stopping at the stop line 108 of the order lane 106.

On the other hand, a vehicle having already remotely placed an order using any of the order receiving systems, which will be described later, of the present embodiments passes through the pick-up lane 104 and goes directly to the stop line 108. A vehicle C3 shown in FIG. 3 is a vehicle stopping at the stop line 108 of the pick-up lane 104.

When a staff member in charge of the item handover counter 107 checks on the stop line 108 and if the vehicle C3 waits on the pick-up lane 104 and the vehicle C2 waits on the order lane 106, then the staff member sets the pick-up lane signal 109 to "GO" and allows the order lane signal 110 to remain at "STOP", and guides the vehicle C3 on the pick-up lane 104 to the item handover counter 107 to hand over items. Namely, when vehicles wait on both of the pick-up lane 104 and the order lane 106, the vehicle C3 on the pick-up lane 104 is given priority.

When the staff member in charge of the item handover counter 107 checks on the stop line 108 and if a vehicle waits on either one of the pick-up lane 104 and the order lane 106, then the staff member sets the signal for the vehicle to "GO" and guides the vehicle to the item handover counter 107 to hand over items. A vehicle C4 shown in FIG. 3 is a vehicle picking up items at the item handover counter 107.

As such, when vehicles wait on both of the pick-up lane 104 and the order lane 106, the vehicle C3 on the pick-up lane 104 is given priority. This is because, as will be described later, the vehicle C3 on the pick-up lane 104 has already remotely placed an order and at the restaurant 102, too, preparation for the provision of items has already been completed at the time of the arrival of the vehicle C3 at the facility; on the other hand, the vehicle C2 on the order lane 106 has just placed an order using the drive-thru system 105 of the restaurant 102 and thus items may not be ready yet. Note that the above-described operation on the signals may be automatically controlled based on the detected values of sensors which are provided near the stop line 108 to sense vehicles on the pick-up lane 104 and the order lane 106.

Although a plurality of embodiments of an order receiving system of the present invention will be described below, the embodiments are merely illustrative and thus the order receiving system of the present invention is not limited to the following embodiments.

First Embodiment

Figure 1:
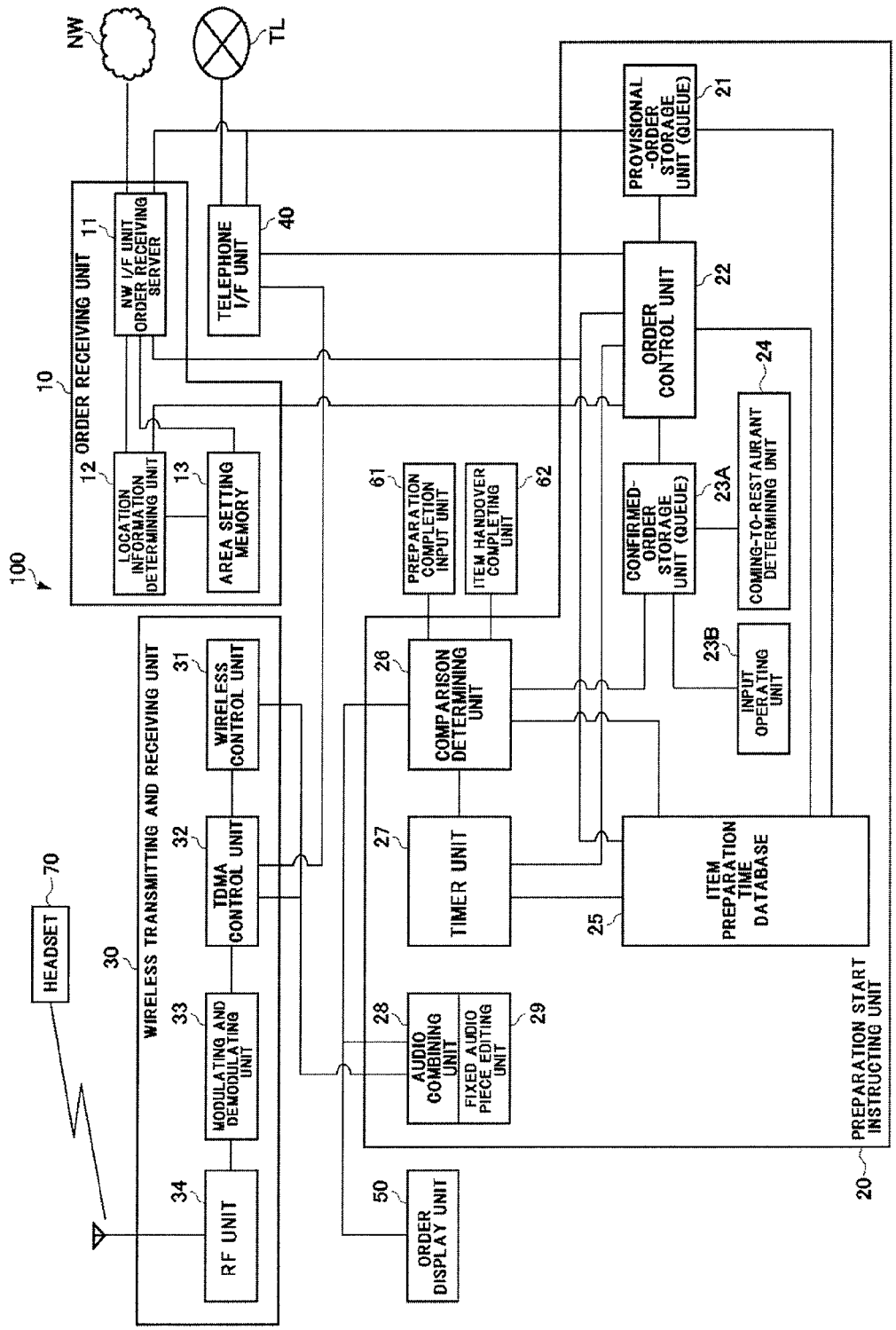
FIG. 1 is a circuit configuration block diagram of an order receiving system of embodiments of the present invention.

With reference to FIG. 1, an order receiving system of a first embodiment will be described in detail.

FIG. 1 is a circuit configuration block diagram of an order receiving system 100 of the present embodiment. First, a schematic configuration of the order receiving system 100 will be described along with the circuit configuration block diagram.

The order receiving system 100 includes an order receiving unit 10, a preparation start instructing unit (reminder instructing unit) 20, a wireless transmitting and receiving unit 30, a telephone interface unit 40, an order display unit 50, a preparation completion input unit 61, and an item handover completing unit 62.

The order receiving unit 10 is connected to a network NW such as the Internet. The order receiving unit 10 performs a process for confirming an order with a customer terminal connected to the network NW. The customer terminal is wirelessly connected to the network NW. In an example of an assumed use of the order receiving system 100, the customer terminal is operated by a user riding in his/her vehicle located distant from the facility or is operated by the user walking. Note, however, that the customer terminal that accesses the order receiving unit 10 to place an order is not limited thereto and may be a fixed terminal connected by wire to the network NW.

The preparation start instructing unit 20 generates preparation start instruction information (reminder), based on the contents of the order received by the order receiving unit 10.

The preparation start instruction information is information for performing reminding (preparation start instruction) to start preparation for the order received by the order receiving unit 10, and includes an audio signal indicating the contents of the order received by the order receiving unit 10 and an instruction to start preparation therefor; and a preparation start control signal. The preparation start instruction information is outputted to the wireless transmitting and receiving unit 30.

The wireless transmitting and receiving unit 30 performs reminding (preparation start instruction) on headsets 70, based on the preparation start instruction information. Specifically, the wireless transmitting and receiving unit 30 distributes the audio signal included in the preparation start instruction information to the plurality of headsets 70. Users of the headsets 70 having received such audio preparation start instruction information, i.e., the staff members at the restaurant, start preparation for the order received by the order receiving unit 10.

The telephone I/F (interface) unit 40 is connected to a telephone line TL (PSDN) and accepts outside lines. In addition, the telephone interface unit 40 is connected to the wireless transmitting and receiving unit 30. The headsets 70 can make outside calls through the wireless transmitting and receiving unit 30, the telephone interface unit 40, and the telephone line TL. In an outside call, the wireless transmitting and receiving unit 30 receives an audio signal sent from a headset 70 and transmits the audio signal to the telephone line TL through the telephone interface unit 40. In addition, an audio signal transmitted from the telephone line TL (PSDN) is provided to the wireless transmitting and receiving unit 30 through the telephone interface unit 40 and is wirelessly transmitted to the headsets 70 from the wireless transmitting and receiving unit 30.

The order display unit 50 displays the contents of the order confirmed by the order receiving unit 10, based on order information from the preparation start instructing unit 20. The order display unit 50 is a liquid crystal monitor.

Specifically, the order display unit 50 has two screen areas. A first display area displays the contents of orders received from customer terminals, and a second display area displays the contents of items inputted, using an input operating unit 23B, by staff members in the restaurant who have received orders from customers coming to the restaurant (see FIG. 9).

In the order receiving system 100 of the present embodiment, the wireless transmitting and receiving unit 30 is placed in the restaurant 102, as the center module 115 (see FIG. 3). The telephone interface unit 40 and the order display unit 50 are also placed in the restaurant 102. As described above, the wireless transmitting and receiving unit 30 serving as the center module 115 is placed near the center of the restaurant so that radio waves can reach the entire staff members' movement range in the restaurant 102. The order display unit 50 is placed in the kitchen 114 so that staff members in the kitchen 114 can easily check it visually.

In the present embodiment, the preparation start instructing unit 20 and the order receiving unit 10 are placed in a different location than the restaurant 102 and are connected, through a communication line, to the wireless transmitting and receiving unit 30, the telephone interface unit 40, and the order display unit 50 which are placed in the restaurant 102. By thus placing the preparation start instructing unit 20 and the order receiving unit 10 in a different location than the restaurant 102, the preparation start instructing unit 20 and the order receiving unit 10 can be connected, through communication lines, to wireless transmitting and receiving units 30, telephone interface units 40, and order display units 50 which are placed in a plurality of restaurants 102, respectively. By this, one preparation start instructing unit 20 and one order receiving unit 10 can be shared between the plurality of stores. In other words, one preparation start instructing unit 20 and one order receiving unit 10 can handle order receiving processes for the plurality of stores. Note that all or part of the configuration of the preparation start instructing unit 20 and the order receiving unit 10 may be placed in the restaurant 102.

The order receiving unit 10 includes a network interface unit 11 (hereinafter, referred to as the "order receiving server 11") that functions as an order receiving server, a location information determining unit 12, and an area setting memory 13. The order receiving server 11 performs communication with customer terminals through the network NW. The customer terminals are wirelessly connected to the network NW. The customer terminals are portable terminals and may be smartphones, etc., that have a function of establishing a connection to the network NW through a wireless line; and a GPS receive function.

The order receiving server 11 stores an order screen format and transmits the order screen format to a customer terminal. On the customer terminal, an order screen is displayed based on the order screen format. A customer inputs order information according to the order screen and transmits the order information.

For information identifying a customer, too, likewise, the order receiving server 11 transmits an input format to a customer terminal. On the customer terminal, a user inputs information identifying him/herself according to the input format and transmits the information to the order receiving server 11. The information identifying a customer is registered upon the first use and is stored in the order receiving server 11, together with an ID of the customer. In this case, upon the next and subsequent orders, instead of re-input, information identifying the customer which is stored in the order receiving server 11 may be read from the customer terminal using the ID of the customer.

The customer terminal obtains its location information using the GPS receive function, and transmits the location information to the order receiving server 11 through the network NW. The location information is specifically information on longitude and latitude.

The order receiving server 11 obtains, from the customer terminal, information identifying the customer, information about an arrival time, and order information (each is reference information). The information identifying the customer includes information on a customer's credit card and information identifying the customer as an individual (name, gender, address, etc.). When a customer's travel means is a vehicle, the information identifying the customer includes information on a license number of the vehicle. The information about an arrival time includes the aforementioned location information and information on the type of the travel means (whether it is vehicle, bicycle, foot, etc.). The information about an arrival time may be an arrival time specified by the customer. The order information includes information identifying a store at which the customer purchases items and information on the items purchased by the customer and the numbers of the items. The order receiving server 11 that thus receives an order from the customer terminal through the communication network corresponds to an order receiving unit of the present embodiment. The order receiving server 11 that receives information about an arrival time from the customer terminal corresponds to an information obtaining unit of the present embodiment.

The location information determining unit 12 stores map information. The location information determining unit 12 identifies the location of the customer terminal, i.e., the location of the customer, by checking the location information received by the order receiving server 11 from the customer terminal against the map information.

Figure 6:
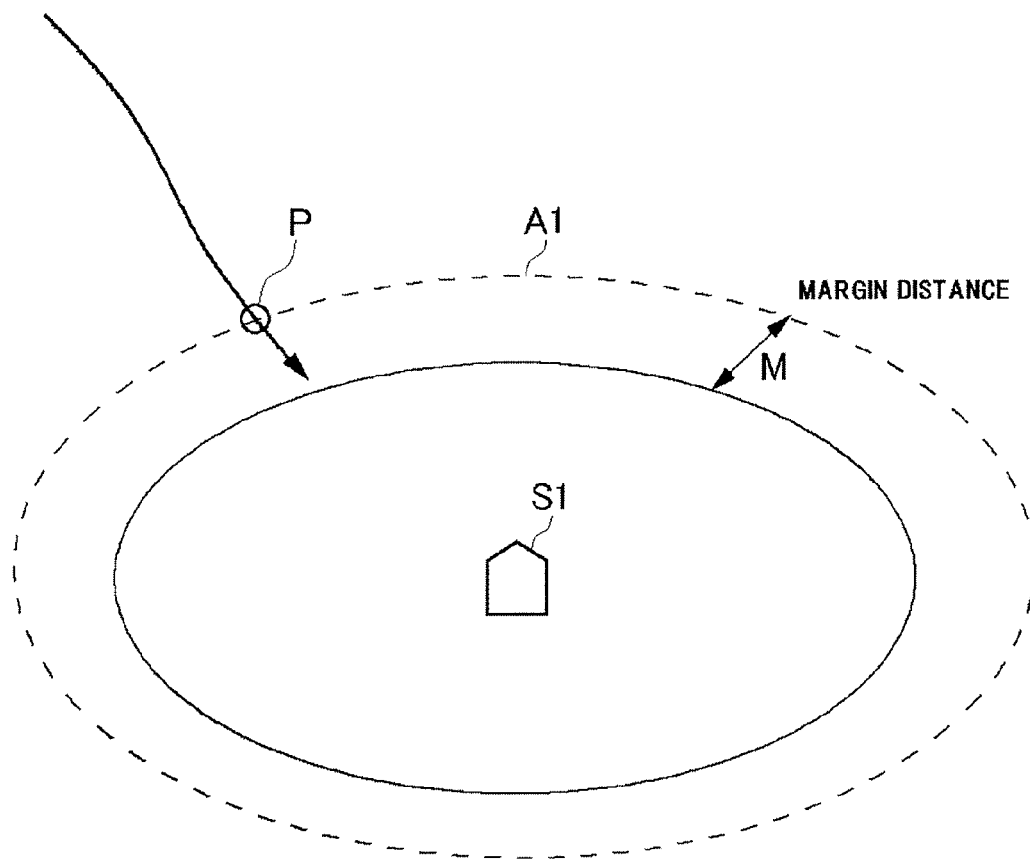
FIG. 6 is a diagram showing a preparation area of a first embodiment of the present invention.

With reference to FIG. 6, the area setting memory 13 identifies a store S1 at which the customer purchases items, based on the information identifying a store at which the customer purchases items, which is included in the order information received by the order receiving server 11 from the customer terminal. Then, the area setting memory 13 sets an area A1 having the restaurant S1 at the center thereof, on a map represented by the map information stored in the location information determining unit 12.

The area setting memory 13 sets the area A1, based on item preparation time which will be described later and the customer's travel means. The area setting memory 13 sets a larger area as the item preparation time is longer and the speed of the customer's travel means is higher. The area setting memory 13 stores in advance standard speeds for each type of travel means. The area setting memory 13 sets, as the area A1, a distance obtained by adding a margin distance M to a distance obtained by multiplying a standard speed for the type of the customer's travel means obtained by the order receiving server 11, by item preparation time. For example, when the standard speed of the vehicle is 30 km/h, the item preparation time is 3 minutes, and the margin distance is 1 km, by computation of 30 (km/h)×3/60 (h)+1 (km)=2.5 (km), a 2.5 km zone with the restaurant being at the center thereof is set as an area. Note that the margin distance M may be set to be longer as the standard speed and/or item preparation time increase.

The order receiving server 11 transmits information on the area set by the area setting memory 13 to the customer terminal through the network NW. The customer terminal receives the information on the set area and monitors the current location by the GPS receive function. When the customer terminal enters the set area, the customer terminal transmits location information to the order receiving server 11. The location information determining unit 12 determines whether the location information of the customer terminal received by the order receiving server 11 has entered the area, by referring to the area set by the area setting memory 13.

Referring back to FIG. 1, the preparation start instructing unit 20 includes a provisional-order storage unit (queue) 21, an order control unit 22, a confirmed-order storage unit (queue) 23A, an input operating unit 23B, a coming-to-store determining unit 24, an item preparation time database 25, a comparison determining unit 26, a timer unit 27, an audio combining unit 28, and a fixed audio piece editing unit 29. The provisional-order storage unit 21 stores, when the order receiving server 11 obtains order information from a customer terminal, the order information.

The order control unit 22 confirms the order information stored in the provisional-order storage unit 21. The order control unit 22 calculates a customer's expected arrival time, based on information on a store, location information of the customer terminal, and information on a travel means which are obtained from the order receiving server 11. The order control unit 22 stores in advance standard speeds for each type of travel means. The order control unit 22 determines time required for a customer to arrive at the restaurant by dividing a distance between the restaurant and the customer terminal by a standard speed according to the type of the travel means, and adds the time to the current time, thereby calculating a customer's expected arrival time. Note that the current time is obtained from the timer unit 27.

The order control unit 22 calculates an expected arrival time by dividing a straight line distance between the restaurant and the customer terminal by a standard speed, or calculates an expected arrival time by dividing the actual travel distance between the restaurant and the customer terminal by a standard speed using map information stored in the location information determining unit 12. The order control unit 22 further obtains information on the traffic conditions of a road between the customer terminal and the restaurant and calculates a customer's expected arrival time, adding the traffic conditions, too. The traffic conditions can be obtained from the item preparation time database 25.

Further, the order control unit 22 determines, for the order information stored in the provisional-order storage unit 21, whether the order information meets an order receiving condition, i.e., whether the order information can be accepted, based on the current time, the customer's expected arrival time, and the item preparation time. The item preparation time is obtained from the item preparation time database 25.

If the order information cannot be accepted, then the order control unit 22 notifies the order receiving server 11 of such a fact, and the order receiving server 11 transmits the notification to the customer terminal to urge the customer to change the order information. If the order information stored in the provisional-order storage unit 21 meets the order receiving condition, then the order control unit 22 confirms the order information and stores, in the confirmed-order storage unit 23A, the calculated customer's expected arrival time and the item preparation time, together with the order information. The input operating unit 23B is used to manually input, by a staff member, items that are directly and orally ordered by customers coming to the restaurant. Order information inputted using the input operating unit 23B is inputted to the confirmed-order storage unit 23A. Thus, the confirmed-order storage unit 23A stores, as described above, items ordered from customer terminals through the ordering receiving unit 10 and items directly ordered by customers at the restaurant.

Furthermore, when the time obtained by adding the item preparation time to the current time is beyond the customer's expected arrival time, the order control unit 22 determines that the order information cannot be accepted. When the restaurant does not have stock corresponding to the order information, too, the order control unit 22 determines that the order information cannot be accepted. A store's inventory status is obtained from the item preparation time database 25.

The coming-to-store determining unit 24 determines whether the customer having placed the order stored in the confirmed-order storage unit 23A has come to the restaurant. The coming-to-store determining unit 24 determines whether the customer has come to the restaurant, by, for example, a vehicle sensor, an in-store wireless detection sensor, or license plate recognition.

The item preparation time database 25 stores information on preparation time for each type of item, the current time, expected handover times (customers' expected arrival times), traffic conditions in the neighborhood of the restaurant, the types of customers' travel means, the working schedule of the restaurant's staff members, store's opening hours, the congestion conditions of the parking lot and lanes, the congestion conditions of customers coming in the restaurant, etc.

The preparation time for each type of item and the restaurant's opening hours are stored in advance in the item preparation time database 25. The numbers of items are obtained from the order control unit 22, as information included in the order information. The current time is obtained from the timer unit 27. The customer's expected arrival times are obtained from the order control unit 22. The traffic conditions in the neighborhood of the restaurant are obtained from a VICS (Vehicle Information and Communication System) center which is not shown. The types of customers' travel means are obtained from the order receiving server 11. The information on the working schedule of the restaurant's staff members, the congestion conditions of the parking lot and lanes, and the congestion conditions of customers coming in the restaurant is obtained from the wireless transmitting and receiving unit 30 placed in the restaurant.

The item preparation time database 25 obtains the order information stored in the provisional-order storage unit 21 from the order control unit 22, calculates time required to prepare for items in the order information (item preparation time), based on information on the preparation time for each type of item in the order information and the numbers of items, the working schedule of the restaurant's staff members, the congestion conditions of customers coming in the restaurant, etc., and provides the calculated time to the order control unit 22. Note that the working schedule of the restaurant's staff members and the congestion conditions of customers coming in the restaurant are coefficients.

In addition, the item preparation time database 25 calculates time required to prepare for each type of item by multiplying the preparation time for each type of item included in the order information by the number thereof, and adds up the times required for all of the items, thereby calculating total required time which serves as a base, and multiples the total required time by the coefficients representing the working schedule of the restaurant's staff members and the congestion conditions of customers coming in the restaurant, thereby determining item preparation time. The item preparation time database 25 stores therein the calculated item preparation time and outputs the calculated item preparation time to the area setting unit 13 and the order control unit 22.

The timer unit 27 provides the current time to the order control unit 22, the item preparation time database 25, and the comparison determining unit 26. The comparison determining unit 26 makes a comparison between the current time obtained from the timer unit 27, the order information and customer's expected arrival time stored in the confirmed-order storage unit 23A, and the item preparation time stored in the item preparation time database 25. When, as a result of the comparison, a predetermined condition is satisfied, the comparison determining unit 26 outputs the order information to the audio combining unit 28 and transmits the order information and the expected arrival time to the order display unit 50.

Specifically, when the current time passes the preparation start time of the order information, the comparison determining unit 26 outputs the order information to the audio combining unit 28 and transmits the order information and the expected arrival time to the order display unit 50. The preparation start time is a time ahead by margin time from a time obtained by subtracting the item preparation time from the customer's expected arrival time. The comparison determining unit 26 that determines a preparation start time from the customer's expected arrival time and the item preparation time, as a condition for starting preparation for the provision of items whose order has been received corresponds to a start condition determining unit. Namely, the fact that the current time reaches the preparation start time corresponds to a condition for starting preparation of the present embodiment, and the comparison determining unit 26 determines the condition.

For example, when the customer's expected arrival time is 13:00, the item preparation time is 5 minutes, and the margin time is 3 minutes, the preparation start time is 12:52 which is obtained by subtracting an item preparation time of 5 minutes and a margin time of 3 minutes (a total of 8 minutes) from an expected arrival time of 13:00. Note that the margin time may be changed according to the length of the item preparation time. For example, the margin time may be set to be longer as the item preparation time is longer.

The order display unit 50 displays the order information and information on the customer's expected arrival time in characters, pictures, etc. The fixed audio piece editing unit 29 stores fixed audio pieces of item names (e.g., "cheeseburger", "hot dog", "orange juice", etc.), the numbers of items (e.g., "one", "two", "three", etc.), and instruction contents ("start preparing", "received an order", "customer came in", "hand over", etc.).

According to the order information, the fixed audio piece editing unit 29 edits fixed audio pieces, and the audio combining unit 28 generates an audio signal announcing the order information. The audio combining unit 28 generates, for example, an audio signal for the audio "start preparing, two, cheeseburger, one, hot dog, two, orange juice". The audio combining unit 28 adds a preparation start control signal to the generated audio signal and transmits the signals to the wireless transmitting and receiving unit 30, as preparation start instruction information.

The wireless transmitting and receiving unit 30 includes a wireless control unit 31, a TDMA control unit 32, a modulating and demodulating unit 33, and an RF unit 34. The wireless control unit 31 controls the TDMA control unit 32, based on the preparation start control signal transmitted from the preparation start instructing unit 20. The TDMA control unit 32 outputs, under control of the wireless control unit 31, the audio signal transmitted from the preparation start instructing unit 20, to the modulating and demodulating unit 33 at appropriate timing.

The modulating and demodulating unit 33 modulates the audio signal and outputs the modulated audio signal to the RF unit 34. The RF unit 34 distributes the modulated audio signal using an antenna. The distributed audio signal is received by the plurality of headsets 70 in the restaurant. Control of the TDMA control unit 32 which is performed by the wireless control unit 31 will be described in detail later.

To the preparation completion input unit 61 is inputted the fact that preparation for the provision of items has been completed. The input is performed by a staff member at the restaurant when preparation for the provision of items has been completed. To the item handover completing unit 62 is inputted the fact that the handover of the items to the customer has been completed. The input is performed by a staff member at the restaurant when the handover of the items to the customer has been completed. Information indicating the completion of the preparation and information indicating the completion of the handover of the items are transmitted to the comparison determining unit 26.

Figure 4:
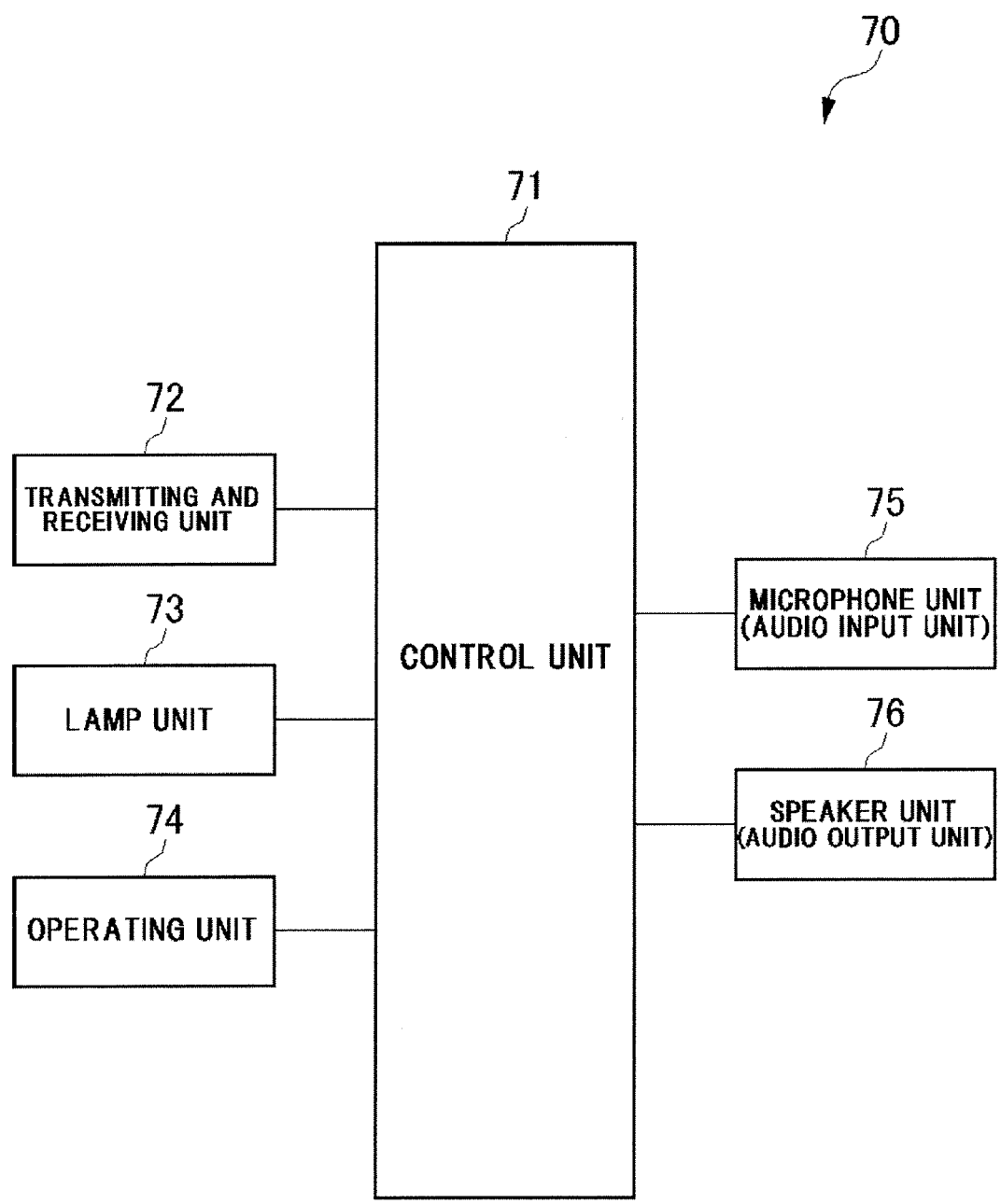
FIG. 4 is a block diagram showing a configuration of a wireless headset of the embodiments of the present invention.

Next, with reference to FIG. 4, a configuration of a headset will be described. FIG. 4 is a functional configuration block diagram showing a configuration of a headset of the present embodiment. A headset 70 includes a control unit 71, a transmitting and receiving unit 72, a lamp unit 73, an operating unit 74, a microphone unit (audio input unit) 75, and a speaker unit (audio output unit) 76.

The control unit 71 controls each component of the headset 70. The transmitting and receiving unit 72 receives signals including an audio signal transmitted from the wireless transmitting and receiving unit 30 (see FIG. 1) which is a center module, and transmits signals including an audio signal to the wireless transmitting and receiving unit 30. The lamp unit 73 is an LED lamp and is turned on and off based on a control signal from the control unit 71. The operating unit 74 includes buttons and a switch and provides, as signals, the operation conditions of the buttons and the switch to the control unit 71. The microphone unit 75 accepts, as input, user's audio and converts the user's audio into an electrical signal. The speaker unit 76 converts an audio signal into audio and outputs the audio.

Figure 5:
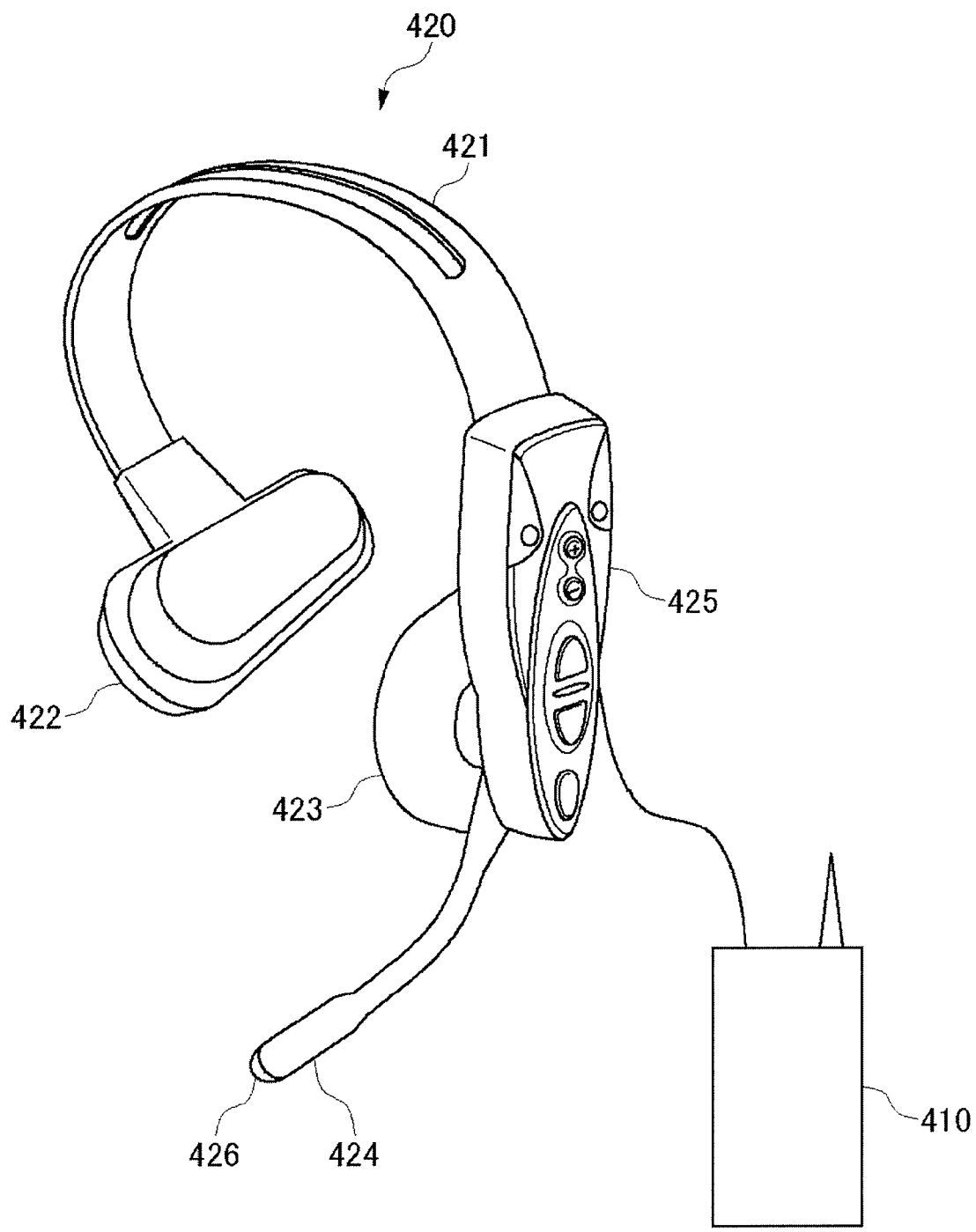
FIG. 5 is a diagram showing a wireless headset having a main body and a headset of the embodiments of the present invention.

The headset 70 is an inter-communication equipment composed of a main body and a headset. FIG. 5 is a diagram showing an example of the headset 70 of the present embodiment which is composed of an inter-communication equipment main body 410 and a headset 420. The inter-communication equipment main body 410 is attached to, for example, a user's waist belt. The inter-communication equipment main body 410 may include a battery, a power switch, etc., which are not shown in FIG. 4, in addition to the transmitting and receiving unit 72. The inter-communication equipment main body 410 is connected by wire to the headset 420, and passing of signals is performed between the inter-communication equipment main body 410 and the headset 420. Note that the inter-communication equipment main body 410 and the headset 420 perform passing of signals by short-range wireless communication such as Bluetooth (registered trademark).

The headset 420 is used by being attached to the head. The headset 420 includes a holder band 421, a holder pad 422, an earphone 423, a microphone 424, an operating unit 425, and a lamp 426.

The holder band 421 is a flexible member curved in a smaller shape than the general head shape so that it can be hooked over the head in a left-right direction. The holder pad 422 is provided at one end of the holder band 421. When the headset 420 is attached to the head, the holder pad 422 abuts on a portion of the head above an ear. At the other end of the holder band 421 is provided the operating unit 425. At the front end of the operating unit 425 are provided the earphone 423 and the microphone 424. The microphone 424 has a long, thin shape so that the front end thereof comes near the mouth of a person having the headset 420 attached thereto, when the headset 420 is attached to the head, and is deformable. At the front end of the microphone 424 is provided the lamp 426.

The headset 70 may be a fixed-type inter-communication equipment. In particular, since it is not desirable for a staff member to wear a headset in the kitchen 114 (see FIG. 3) in terms of hygiene, an inter-communication equipment including a wall hanging speaker may be adopted.

Next, a circuit configuration block of the order receiving system of the present embodiment will be described along with FIG. 2.

A main body 100 functions by being coupled to a portable terminal F0, a network NW, and a general telephone line PSDN by wire or wireless. An order receiving unit F2 can receive, by a receiving unit F1, a customer's item order placed from the portable terminal F0, the network NW, and the general telephone line PSDN. Namely, the order receiving unit F2 stores and determines an item order and location information received by the receiving unit F1. An information obtaining unit F7 obtains reference information for determining a condition for starting preparation for the provision of items whose order has been received by the order receiving unit F2.

A start condition setting unit F8 sets the condition for starting preparation for the provision of items whose order has been received by the order receiving unit F2, based on the contents of the order and the reference information. A condition determining unit F9 determines, after receiving the order for items by the order receiving unit F2, whether the condition set by the start condition setting unit F8 is satisfied. In addition, the system includes a wireless headset F4 capable of performing transmission and reception; and a wireless transmitting and receiving unit F6 that transmits various types of signals to the wireless headset F4. The wireless transmitting and receiving unit F6 transmits a preparation start instruction signal to the wireless headset F4. The system further includes an input operating unit F10 and a control unit F11 that controls each of the above-described units.

Figure 2:
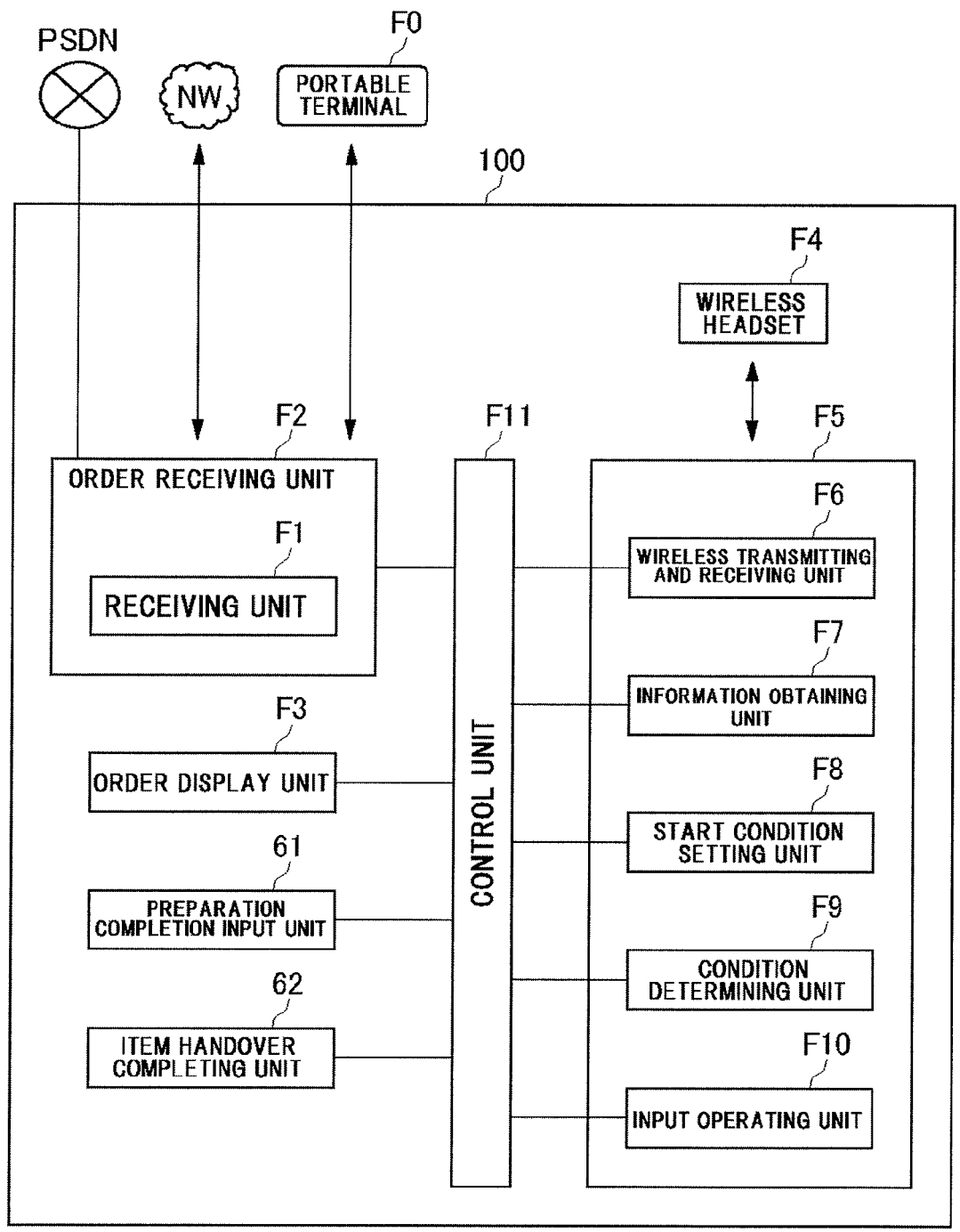
FIG. 2 is a functional configuration block diagram of the order receiving system of the embodiments of the present invention.

Therefore, in FIGS. 1 and 2, the order receiving unit F2 shown in FIG. 2 corresponds to the order receiving server 11, the location information determining unit 12, and the area setting memory 13 shown in FIG. 1. A preparation start instructing unit F5 shown in FIG. 2 corresponds to the preparation start instructing unit 20 shown in FIG. 1. The control unit F11 shown in FIG. 2 corresponds to the order control unit 22, the wireless control unit 31, and the TDMA control unit 32 shown in FIG. 1. An order display unit F3 shown in FIG. 2 corresponds to the order display unit 50 shown in FIG. 1. The input operating unit F10 shown in FIG. 2 corresponds to the input operating unit 23B shown in FIG. 1.

The operation of the order receiving system 100 configured in the above-described manner will be described.

Figure 7:
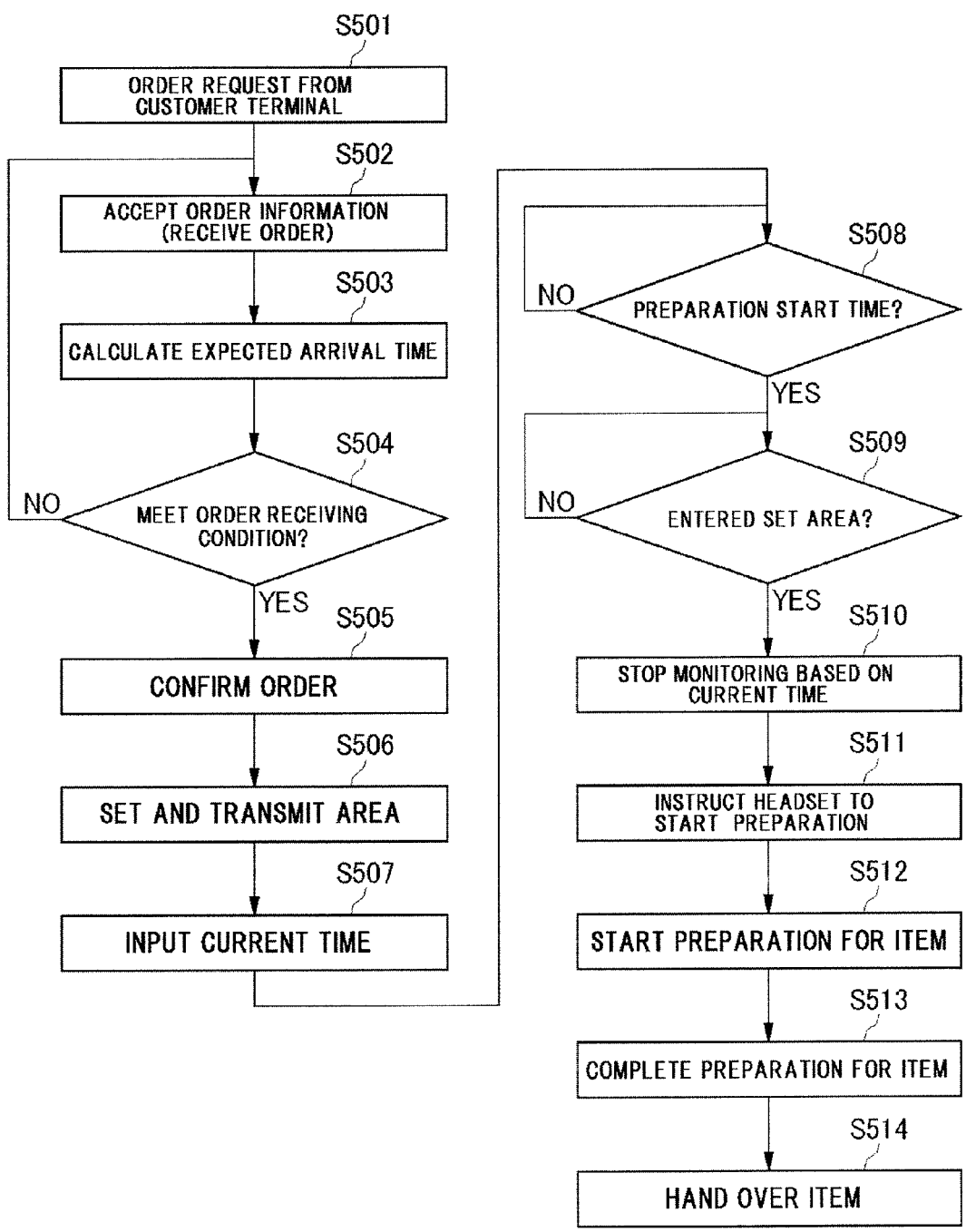
FIG. 7 is an operation flowchart of an order receiving system of the first embodiment of the present invention.

FIG. 7 is an operation flowchart of the order receiving system 100 of the present embodiment. First, the order receiving server 11 receives an order request from a customer terminal (step S501).

In addition, according to this, the order receiving server 11 transmits an order screen format to the customer terminal. By a customer selecting items on the customer terminal according to the order screen and transmitting an order, the order receiving server 11 accepts this order information (reference information) (step S502). Note that this step corresponds to the function of the information obtaining unit F7 shown in FIG. 2.

The order control unit 22 provides the order information to the item preparation time database 25. The item preparation time database 25 calculates item preparation time based on the order information, and stores the item preparation time therein and outputs the item preparation time to the order control unit 22. Based on location information of the customer terminal and location information of a store, the order control unit 22 calculates an expected arrival time at which the customer arrives at the restaurant (step S503). In addition, the timer unit 27 outputs the current time to the order control unit 22. Note that this step corresponds to the function of the start condition setting unit F8 shown in FIG. 2.

In addition, the order control unit 22 determines whether the order information meets an order receiving condition, based on the current time, the expected arrival time, and the item preparation time (step S504). Note that this step corresponds to the function of the condition determining unit F9 shown in FIG. 2.

If the order information does not meet the order receiving condition (NO at step S504), then processing returns to step S502 and order information from the customer terminal is accepted again. If the order information meets the order receiving condition (YES at step S504), then the order is confirmed and the order information and the expected arrival time are stored in the confirmed-order storage unit 23A (step S505).

With reference to FIG. 9, when the items ordered from the customer terminal are confirmed, the items are displayed in the "remote order" area of the order display unit 50. For example, order No. 17 shows the latest ordered items, and "hamburger (3)", "french fries (3)", "orange juice (2)" and "coffee (1)" indicate three hamburgers, two french fries, two orange juices, and one coffee. When an order is directly received from a customer coming to the restaurant, a staff member inputs corresponding items and the numbers thereof using the input operating unit 23B, by which the inputted items and numbers are displayed in the "restaurant order" area.

Therefore, when the order is confirmed at this step S505, the ordered item names and the numbers thereof are immediately displayed in the "remote order" area.

When the order is confirmed, the area setting memory 13 sets a preparation area, and the order receiving server 11 transmits the preparation area to the customer terminal (step S506). As described above, the preparation area is set, based on the item preparation time and a customer's travel means, as a range that allows preparation for the provision of items to be completed immediately before the customer arrives at the restaurant if the preparation for the provision of items starts when the customer enters the preparation area, and corresponds to a preparation area of the present embodiment.

Then, the comparison determining unit 26 starts an input of the current time from the timer unit 27 (step S507) and monitors whether a preparation start time has come (step S508). The preparation start time is, as described above, a time ahead by margin time from a time obtained by subtracting the item preparation time from the customer's expected arrival time. To determine whether the preparation start time has come, the comparison determining unit 26 obtains the customer's expected arrival time from the confirmed-order storage unit 23A and obtains the item preparation time from the item preparation time database 25.

If the preparation start time has come (YES at step S508), then the comparison determining unit 26 checks whether a notification indicating that the customer terminal has entered an area A1 set by the area setting memory 13 has been received from the customer terminal (step S509). If a notification indicating that the customer terminal has entered an area A1 set by the area setting memory 13 has been received from the customer terminal (YES at step S509), then the comparison determining unit 26 stops the monitoring based on the current time from the timer unit 27 (step S510) and outputs the order information to the order display unit 50 and the audio combining unit 28.

The audio combining unit 28 generates an audio signal according to the order information, and outputs the audio signal together with a preparation start control signal to the wireless transmitting and receiving unit 30. In the wireless transmitting and receiving unit 30, the wireless control unit 31 controls the TDMA control unit 32, based on the preparation start control signal. The TDMA control unit 32 outputs the received audio signal to the modulating and demodulating unit 33, according to the control performed by the wireless control unit 31. The RF unit 34 transmits (distributes) the modulated audio signal, thereby instructing inter-communication equipments which are headsets to start preparation (step S511). Note that at this timing a certain percentage (e.g., 20%) of the payment for the items is charged to the order information.

With reference to FIGS. 9, 10, and 11, assuming that at step S511, for example, a customer terminal for order No. 14 in FIG. 9 satisfies the condition, with reference to FIG. 9, the comparison determining unit 26 sends out an instruction to the order display unit 50 and the order display unit 50 moves the display of item names and the numbers thereof for order No. 14 from the "remote order" to "restaurant order" area and further circles the number of the order No.

Screen display shown in FIG. 10 is a display mode where the contents of an order for order No. 14 shown on a remote order screen are displayed at the top of a restaurant order screen. Screen display shown in FIG. 11 is a display mode where the contents of an order for order No. 14 shown on the remote order screen are displayed at the bottom of the restaurant order screen. The two modes can be switched by a user from the input operating unit F10.

Note that in FIG. 11 for those orders in the "restaurant order" area, since customers are waiting in the restaurant, preparation for the provision of items need to be started one after another. When a remote order satisfies a predetermined condition, the contents of the remote order such as No. 14, for example, are displayed.

Hence, a staff member in charge of preparation can make a selection as to whether priority is given to preparation for from order No. 21 to order No. 23 or priority is given to preparation for an order for items for order No. 14. In addition, for example, when there are a plurality of staff members in charge of preparation in the restaurant, items for order No. 21 and for order No. 14 can be simultaneously prepared.

When the staff members at the restaurant are instructed through the headsets 70 to start preparation, they start preparation for the provision of items (step S512). When the preparation for the provision of items has been completed (step S513), the customer arrives at the restaurant after a short while. At this time, with reference to FIG. 3, the customer's vehicle passes through the pick-up lane 104 and moves directly to the stop line 108 and moves to the item handover counter 107 according to the signal 109. A staff member at the restaurant hands over the items of the order information to the customer at the item handover counter 107 and collects the remaining charges from the customer (step S514).

Next, the operation of the wireless transmitting and receiving unit 30 serving as a center module will be described. Prior to description of the operation of the wireless transmitting and receiving unit 30, the telephone conversation mode of a wireless communication system including the wireless transmitting and receiving unit 30 serving as a center module and a plurality of headsets 70 will be described. The telephone conversation mode has a page mode and a talk mode.

The page mode is a mode that allows only telephone conversations between the staff members, with telephone conversations with customers being cut off. Specifically, in the page mode, a headset for a drive-thru (menu board microphone and speaker) including an outside speaker as an audio output unit is disconnected from the wireless communication system and thus a telephone conversation cannot be heard from the outside speaker of the menu board microphone and speaker. Use of the page mode enables business communication between the staff members. The talk mode allows telephone conversations between headsets including a menu board microphone and speaker, and is used in normal operations such as receiving of orders at the drive-thru.

A staff member can have a telephone conversation by specifying either the page mode or the talk mode by operating the operating unit 425 of the headset (see FIG. 5). In addition, the drive-thru system is provided with a vehicle sensor that senses a vehicle placing an order at the drive-thru. By the vehicle sensor sensing a vehicle, too, the talk mode starts.

Figure 8:
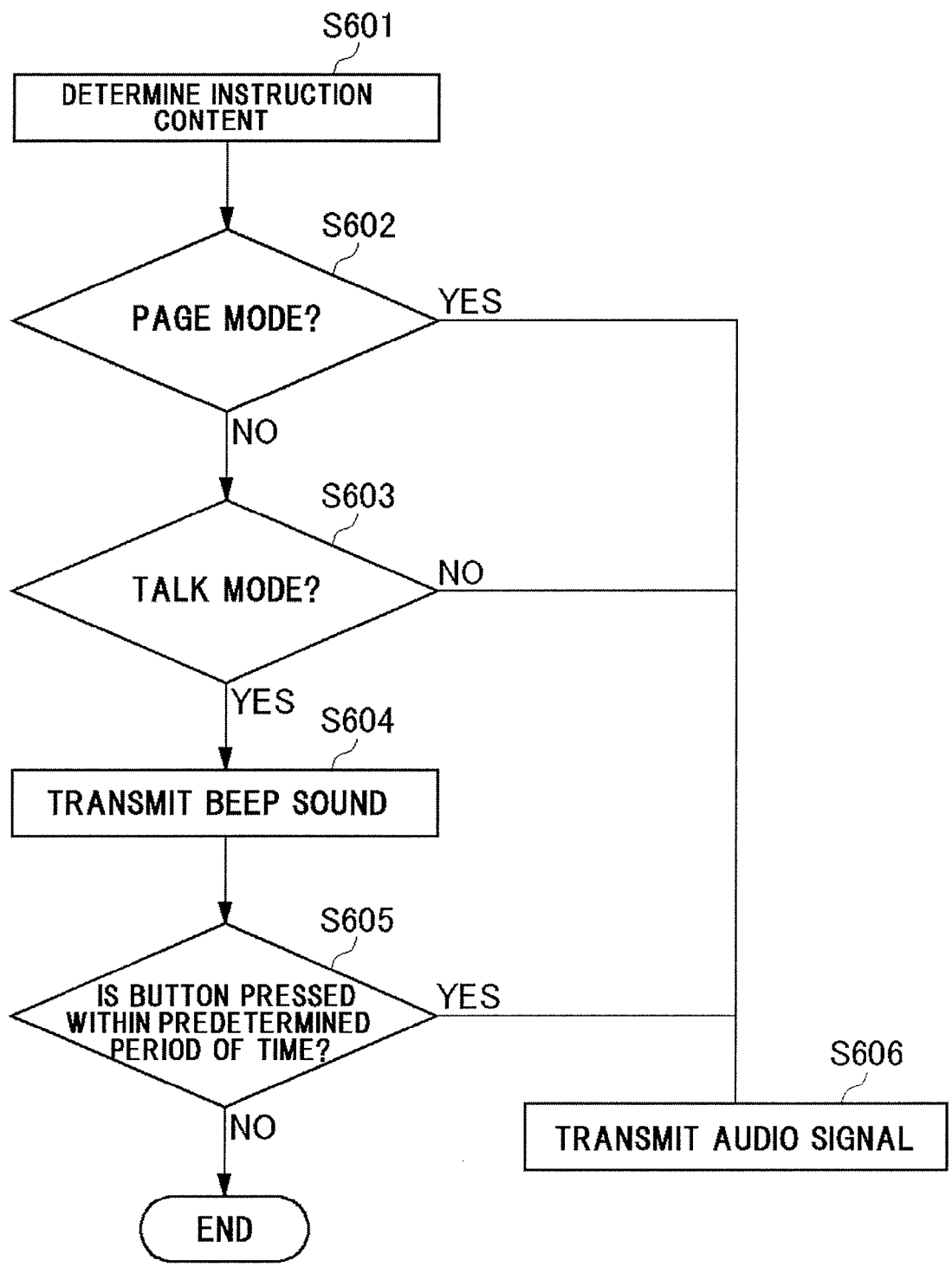
FIG. 8 is an operation flowchart of a wireless transmitting and receiving unit of the first embodiment of the present invention.

FIG. 8 is an operation flowchart of the wireless transmitting and receiving unit 30 of the present embodiment. The wireless control unit 31 having received a preparation start control signal determines an instruction content thereof (step S601). The wireless control unit 31 determines whether a telephone conversation in the page mode is taking place in an inter-communication system including the wireless transmitting and receiving unit 30 serving as a center module and a plurality of headsets 70 (step S602). If a telephone conversation in the page mode is taking place (YES at step S602), then the wireless control unit 31 controls the TDMA control unit 32 to distribute a received audio signal to the plurality of headsets 70 (step S606).

If a telephone conversation in the page mode is not taking place (NO at step S602), then the wireless control unit 31 further determines whether a telephone conversation in the talk mode is taking place (step S603). If a telephone conversation in the talk mode is not taking place, either (NO at step S603), then as in the case in which a telephone conversation in the page mode is taking place, the wireless control unit 31 controls the TDMA control unit 32 to distribute an audio signal included in received preparation start instruction information to the plurality of headsets 70 (step S606).

If a telephone conversation in the talk mode is taking place, the wireless control unit 31 controls the TDMA control unit 32 to transmit a beep sound to a headset 70 (step S604). By this, the headset 70 can know that preparation start instruction information has been received at the restaurant, without interrupting the telephone conversation in the talk mode or without superimposing audio notifying the start of preparation on the telephone conversation in the talk mode. Note that along with the output of the beep sound, the lamp 426 of the headset 420 of the headset 70 (see FIG. 5) may be turned on or off.

When the telephone conversation in the talk mode ends, a relevant staff member at the restaurant performs a predetermined operation on the operating unit 74 of the headset 70 to receive an audio signal, by which an audio signal is transmitted to the wireless transmitting and receiving unit 30. The wireless control unit 31 monitors whether an operation signal is received within a predetermined period of time (step S605). If received (YES at step S605), then the wireless control unit 31 transmits an audio signal to the headset, according to the operation signal (step S606). Note that if an operation signal is not received within the predetermined period of time (NO at step S605), then the wireless control unit 31 performs a time-out and ends the process.

As described above, according to the order receiving system 100 of the present embodiment, an order is remotely received from a customer terminal and preparation for food and drinks which are items can be completed before a customer arrives at a store, which avoids the customer who picks up the items at the drive-thru from waiting for preparation for the provision of the items. In addition, at the restaurant, instead of starting preparation for the provision of items immediately after receiving an order from a customer terminal in a remote location, preparation for the provision of items can start at appropriate timing such that preparation for the provision of items is completed immediately before a customer arrives at the restaurant. Thus, hot items can be provided to the customer while they are hot and cold items can be provided to the customer before they get warm.

In addition, since a staff member at the restaurant is reminded, by audio, of an order received from a customer terminal at timing at which he/she should start preparation therefor, the staff member does not need to worry about time management as to at which timing he/she starts preparing for the order received from the customer terminal. The staff member at the restaurant only needs to start preparation for the provision of items at the time of hearing audio for the start of preparation and in the same manner as when he/she receives a normal order from a customer coming to the restaurant.

In addition, in the above-described order receiving system 100, instead of starting preparation for the provision of items based only on an expected arrival time which is calculated simply based on customer's location information obtained when an order is received from a customer and the type of a travel means, preparation for the provision of items starts by confirming that (a portable terminal of) the customer actually approaches the restaurant and has entered a predetermined area with the restaurant being at the center thereof (step S509 in FIG. 7). Thus, preparation for the provision of items can be completed more securely according to the customer's arrival time.

In addition, in the wireless transmitting and receiving unit 30, when a telephone conversation in the talk mode is taking place, reception of preparation start instruction information is notified to a headset 70 by a beep sound. Thus, the telephone conversion in the talk mode is not interrupted by audio for the start of preparation, and the fact that the center module has received preparation start instruction information can be notified to a staff member by audio (beep sound). Since the staff member can receive an audio signal for the start of preparation from the center module by performing a predetermined operation after ending the telephone conversion in the talk mode, the staff member does not miss hearing audio for the start of preparation as a result of giving priority to the talk mode.

Note that the wireless transmitting and receiving unit 30 may notify at all times the headsets of the fact that preparation start instruction information has been received, regardless of the telephone conversation mode. By this, the staff members at the restaurant can know that the center module has received an audio signal for the start of preparation and can receive and hear an audio signal for the start of preparation at their convenient timing. For example, when a staff member cannot hear the content of audio for the start of preparation in a crowd, he/she can receive and hear an audio signal for the start of preparation after it gets relatively quiet, which enables to circumvent a situation where he/she cannot hear audio for the start of preparation.

In addition, if, instead of audio for the start of preparation instructing to immediately start preparation for items, a staff member is informed, at timing at which an order is received, about information instructing to complete preparation for the provision of items at a predetermined future time (customer's expected arrival time) or information instructing to start preparation for the provision of items at a predetermined future time (item preparation start time) by audio using an inter-communication equipment, then the staff member needs to remember the instruction until the future time at which preparation for the provision of items should start. If such information is also displayed on the order display unit 50, then the staff member can theoretically start preparation for the provision of items according to order information at appropriate timing by checking the order display unit 50. However, it is not operationally realistic for the staff member to perform normal operations while periodically monitoring the order display unit 50. On the other hand, in the above-described order receiving system 100, a staff member can hear, by audio through an inter-communication equipment, the start of preparation instructing to immediately start preparation for the provision of items. Thus, a problem such as that described above does not occur, and the staff member can start preparation for the provision of items at the time of hearing audio for the start of preparation and in the same manner as when he/she receives a normal order from a customer coming to the restaurant.

Note that in the first embodiment the order control unit 22 does not need to calculate an expected arrival time, and the comparison determining unit 26 does not need to compare a preparation start time with the current time from the timer unit 27. Namely, in the present embodiment, the area setting memory 13 sets, as an area, a distance where a customer terminal is located at timing at which preparation for the provision of items should start at the restaurant. When the customer terminal has entered the set area, the comparison determining unit 26 outputs order information to the audio combining unit 28 in order to allow the staff members at the restaurant to start preparation for the provision of items. In this case, the fact that the customer terminal has entered the set area is determined by the location information determining unit 12 of the order receiving unit 10, based on location information obtained from the customer terminal.

Second Embodiment

A configuration of an order receiving system of the present embodiment is the same as that of an order receiving system 100 of the first embodiment shown in FIG. 1. In the present embodiment, an area setting memory 13 sets two areas, small and large, based on item preparation time which will be described later, and a customer's travel means. The small area R is also referred to as a first range and the large area L is also referred to as a second range. The area setting memory 13 sets, for both of the two areas, large and small, a larger area as the item preparation time is longer and the speed of the customer's travel means is higher.

As in the first embodiment, the area setting memory 13 stores in advance standard speeds for each type of travel means. The area setting memory 13 determines a distance obtained by multiplying a standard speed for the type of a customer's travel means obtained by an order receiving server 11, by item preparation time and sets, as areas, distances obtained by adding margin distances for the two areas, small and large, to the obtained distance.

For example, when the standard speed of the vehicle is 30 km/h, the item preparation time is 3 minutes, the margin distance for the small area R is 1 km, and the margin distance for the large area L is 3 km, by computation of 30 (km/h)×3/60 (h)+1 (km)=2.5 (km), a 2.5 km zone with the restaurant being at the center thereof is set as the small area R (first range), and by computation of 30 (km/h)×3/60 (h)+3 (km)=4.5 (km), a 4.5 km zone with the restaurant being at the center thereof is set as the large area L (second range). Note that the margin distances may be set to be longer as the standard speed and/or the item preparation time increase.

The order receiving server 11 transmits information on the two areas, small and large, set by the area setting memory 13 to a customer terminal through a network NW. The customer terminal receives the information on the two areas and monitors the current location by the GPS receive function. When the customer terminal enters each set area, the customer terminal transmits location information to the order receiving server 11. A location information determining unit 12 determines whether the location information of the customer terminal received by the order receiving server 11 has entered either area, by referring to the areas set by the area setting memory 13.

Figure 12:
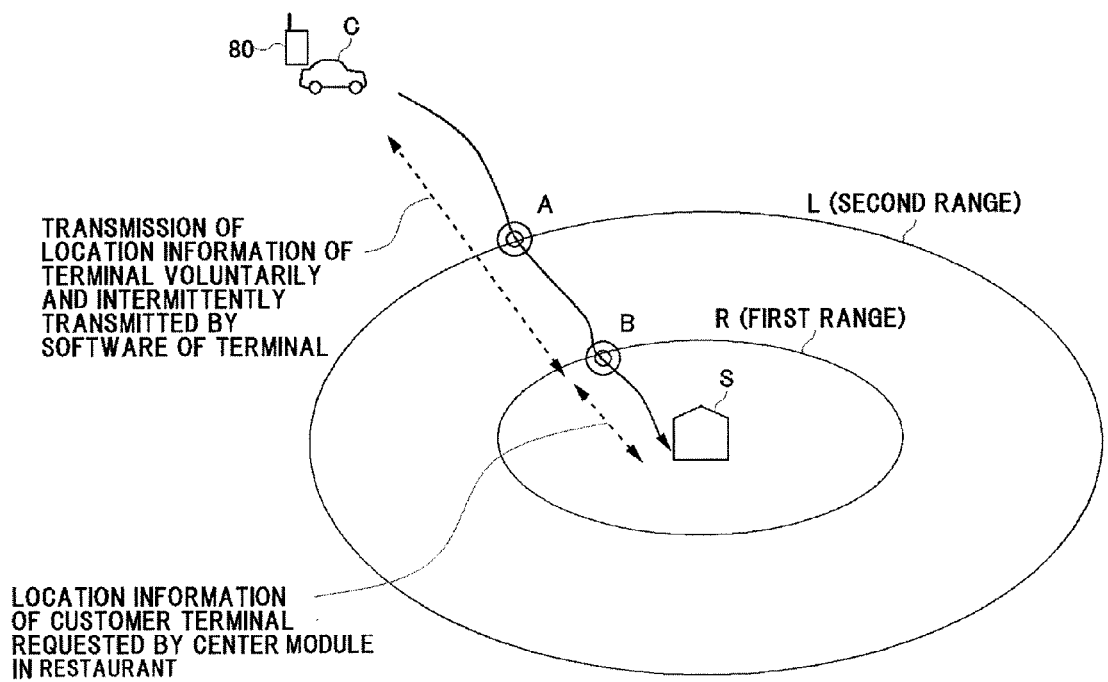
FIG. 12 is a diagram showing two areas, small and large, of a second embodiment of the present invention.

FIG. 12 is a diagram showing two areas, small and large, of the present embodiment. A (terminal 80) of a customer C places an order outside a large area L (second range) and heads to a store S. When the order is placed, the customer terminal 80 obtains information on two areas, small and large, from the order receiving server 11. When the customer terminal 80 obtains the information on the areas, the customer terminal 80 monitors whether the current location thereof is in the large area L. When the customer C moves toward the restaurant S and enters the large area L (second range) at a point A, the customer terminal 80 transmits location information obtained at that time to the order receiving server 11.

The customer terminal 80 continues to monitor whether the current location thereof is in a small area R (first range). When the customer terminal 80 enters the small area R (first range) at a point B, the customer terminal 80 transmits location information obtained at that time to the order receiving server 11.

When the order receiving server 11 can confirm by the location information determining unit 12 that the customer terminal 80 has entered the small area R (first range), the order receiving server 11 requests the customer terminal to continue to transmit location information (reference information) thereof. In response to the request, after the customer terminal 80 enters the small area R (first range), the customer terminal 80 continues to transmit location information thereof to the order receiving server 11 until arriving at the restaurant S. To put it the other way around, instead of the customer terminal 80 continuing to transmit location information thereof to the order receiving server 11 immediately after placing an order, the customer terminal 80 does not transmit location information thereof to the order receiving server 11 after reaching the first range, unless there is a request from the order receiving server 11. By this, customer privacy is maintained.

As such, a small area of the present embodiment where continuous obtaining of customer's location information starts corresponds to a tracking area of the present embodiment, and the order receiving server 11 that continuously obtains customer's location information corresponds to a location information obtaining unit of the present embodiment. Note that in the present embodiment, the small area R corresponds to a preparation area and also corresponds to a tracking area. However, the tracking area does not necessarily need to coincide with the preparation area. The tracking area may be larger than the preparation area or conversely smaller than the preparation area.

Note that according to the fact that entering of the customer terminal 80 into the large area L has been notified to the order receiving server 11, an order display unit 50 may display such a fact, an audio combining unit 28 may generate an audio signal notifying of such a fact and transmit the audio signal to a wireless transmitting and receiving unit 30, and the wireless transmitting and receiving unit 30 may distribute the audio signal to headsets 70, by which the fact that the customer terminal 80 has entered the large area L may be notified to staff members.

Figure 13:
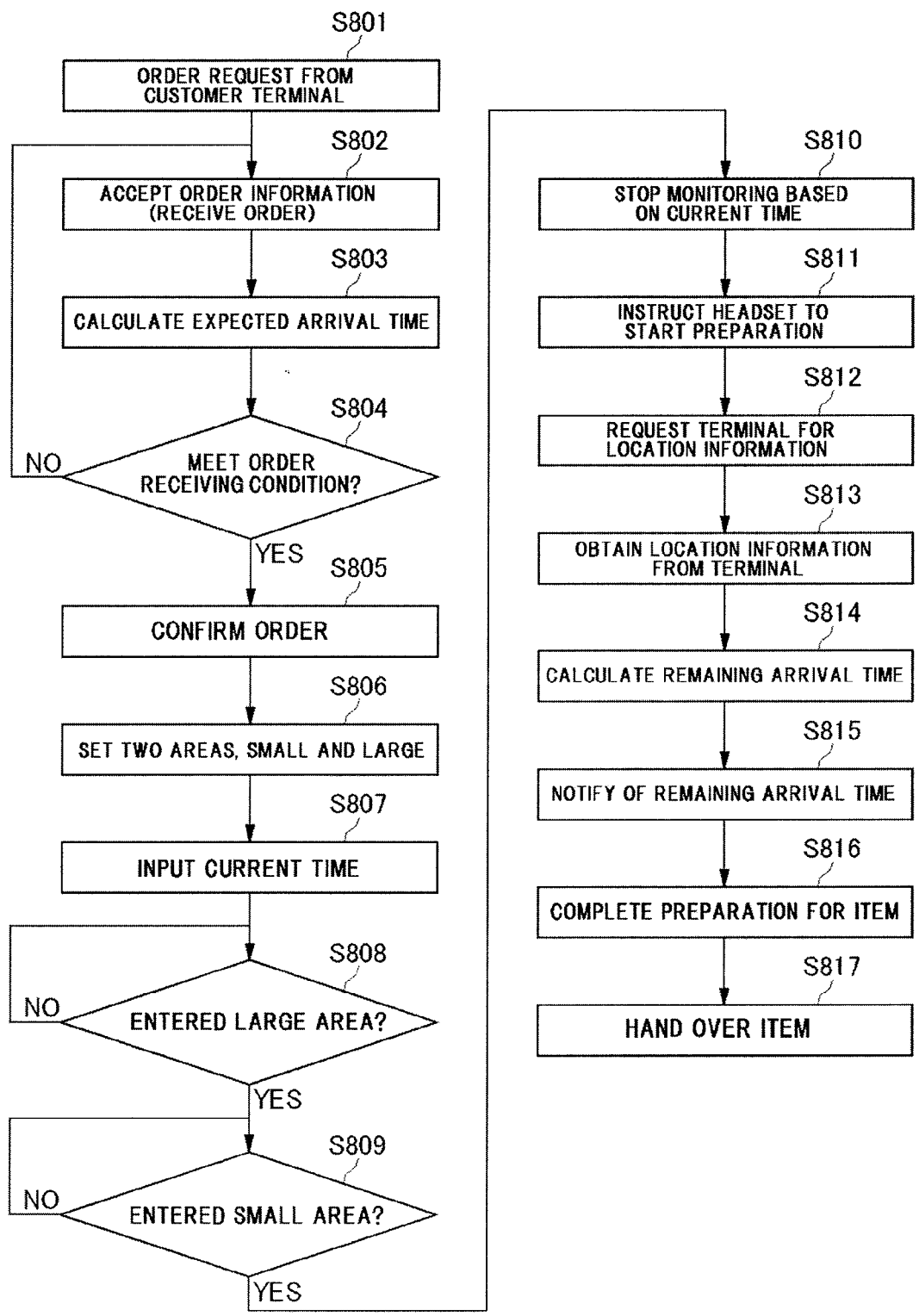
FIG. 13 is an operation flowchart of an order receiving system of the second embodiment of the present invention.

FIG. 13 is an operation flowchart of an order receiving system 100 of a second embodiment. First, the order receiving server 11 receives an order request from a customer terminal 80 (step S801). According to this, the order receiving server 11 transmits an order screen format to the customer terminal 80. By a customer selecting items on the customer terminal 80 according to the order screen and transmitting an order, the order receiving server 11 accepts this order information (step S802).

The order information (reference information) is stored in a provisional-order storage unit 21. An order control unit 22 provides the order information stored in the provisional-order storage unit 21 to an item preparation time database 25. The item preparation time database 25 calculates item preparation time based on the order information, and stores the item preparation time therein and outputs the item preparation time to the order control unit 22. Based on location information of the customer terminal 80 and location information of a store, the order control unit 22 calculates an expected arrival time at which the customer arrives at the restaurant (step S803). In addition, a timer unit 27 outputs the current time to the order control unit 22.

The order control unit 22 determines whether the order information meets an order receiving condition, based on the current time, the expected arrival time, and the item preparation time (step S804). If the order information does not meet the order receiving condition (NO at step S804), then processing returns to step S802 and order information from the customer is accepted again. If the order information meets the order receiving condition (YES at step S804), then the order is confirmed and the order information and the expected arrival time are stored in a confirmed-order storage unit 23A (step S805).

When the order is confirmed, the area setting memory 13 sets two areas, small and large, and the order receiving server 11 transmits the two areas to the customer terminal 80 (step S806). The two areas, small and large, are set based on the item preparation time and a customer's travel means, as described above. A comparison determining unit 26 accepts as input the current time from the timer unit 27 and starts monitoring based on the current time (step S807). Then, the location information determining unit 12 determines whether the customer terminal 80 has entered the large area L (second range), i.e., whether a notification indicating such a fact has been received from the customer terminal 80 (step S808).

If the customer terminal 80 has entered the large area L (YES at step S808), then the location information determining unit 12 continuously determines whether the customer terminal 80 has entered the small area R (first range) (step S809). As described above, since the small area R is set such that some margin time is allowed for the item preparation time, preparation for the provision of items should start at timing at which the customer terminal 80 has entered the small area R.

Note that an order display unit F3 changes display in the same manner as in the first embodiment.

Hence, if the order receiving system 100 receives from the customer terminal 80 a notification indicating that the customer terminal 80 has entered the small area R set by the area setting memory 13 (YES at step S809), then the order receiving system 100 stops the monitoring based on the current time from the timer unit 27 (step S810) and outputs the order information to the audio combining unit 28.

The audio combining unit 28 generates an audio signal according to the order information and transmits, as preparation start instruction information, the audio signal together with a preparation start control signal to the wireless transmitting and receiving unit 30. In the wireless transmitting and receiving unit 30, a wireless control unit 31 controls a TDMA control unit 32 based on the preparation start control signal, the TDMA control unit 32 outputs the received audio signal to a modulating and demodulating unit 33 according to the control performed by the wireless control unit 31, and an RF unit 34 transmits (distributes) the modulated audio signal, thereby instructing users of inter-communication equipments which are headsets, i.e., staff members at the restaurant, to start preparation (step S811). Note that at this timing a certain percentage (e.g., 20%) of the payment for the items may be charged to the order information.

When the staff members at the restaurant are instructed through the headsets to start preparation, they start preparation for the provision of items. Then, since the customer terminal 80 is already in the small area R at this time, the order receiving server 11 continues to request the customer terminal 80 for location information (step S812) and continuously obtains location information from the customer terminal (step S813). Then, the order control unit 22 calculates a customer's expected arrival time based on location information of the customer terminal received by the order receiving server 11 which changes momentarily, and every time an expected arrival time is calculated, the order control unit 22 outputs the expected arrival time to the comparison determining unit 26.

Every time an expected arrival time is inputted to the comparison determining unit 26, the comparison determining unit 26 calculates remaining arrival time indicating how many minutes it takes for the customer to arrive at the restaurant, by subtracting the current time from the timer unit 27 from the expected arrival time (step S814). The comparison determining unit 26 outputs (transmits) the remaining arrival time to the order display unit 50 and the audio combining unit 26. The order display unit 50 displays the remaining arrival time together with the order information.

A fixed audio piece editing unit 29 stores fixed audio pieces of customers' expected arrival times ("in one minute", "in two minutes", "in five minutes", etc.) in addition to item names (e.g., "cheeseburger", "hot dog", "orange juice", etc.) and the numbers of items (e.g., "one", "two", "three", etc.). According to the order information, the fixed audio piece editing unit 29 edits fixed audio pieces, and the audio combining unit 28 generates an audio signal announcing the order information and also edits fixed audio pieces according to the remaining arrival time outputted from the comparison determining unit 26 and generates an audio signal announcing the remaining arrival time.

For example, at timing at which preparation for the provision of items should start, the audio combining unit 28 generates an audio signal for the audio "start preparing for, order number 218, two cheeseburger, one, hot dog, two, orange juice". Thereafter, based on location information of the customer terminal 80, the audio combining unit 28 generates the audio signal "order number 218, arrive in two minutes".

The audio combining unit 28 transmits, as preparation start instruction information, the generated audio signals (the audio signal for the preparation start instruction and the audio signal for the remaining arrival time) and a preparation start control signal to the wireless transmitting and receiving unit 30. The wireless transmitting and receiving unit 30 informs the headsets 70 of the audio signal for the remaining arrival time, in the same manner as in the first embodiment (step S815). The staff members at the restaurant can adjust the progress of preparation for the provision of items by hearing the remaining arrival time.

When preparation for the provision of items has been completed (step S816), the customer arrives at the restaurant after a short while. At this time, a customer's vehicle passes through the pick-up lane 104 and moves directly to the stop line 108 and moves to the item handover counter 107 according to the signal 109. A staff member at the restaurant hands over the items of the order information to the customer at the item handover counter 107 and collects the remaining charges from the customer (step S817).

In the present embodiment, in the process up to the point where the customer terminal 80 arrives at the restaurant after placing an order, in a stage where the distance to the restaurant is relatively far, the customer terminal 80 intermittently transmits location information to the order receiving system 100, and after approaching closer than a predetermined distance, the customer terminal 80 continuously transmits location information. Thus, customer privacy is protected.

Since the customer terminal 80 continuously transmits location information to the order receiving server 11 after the customer approaches the restaurant, during that period a customer's expected arrival time can be predicted every time location information is transmitted. Thus, preparation for the provision of items can be more ideally completed immediately before the customer arrives at the restaurant.

Note that in the second embodiment the order control unit 22 does not need to calculate an expected arrival time, and the comparison determining unit 26 does not need to compare a preparation start time with the current time from the timer unit 27. Namely, in the second embodiment, a distance where the customer terminal 80 is located at timing at which preparation for the provision of items should start at the restaurant is set as a small area R (first range). At timing at which the customer terminal 80 enters the small area R, the comparison determining unit 26 outputs order information in order to allow the staff members at the restaurant to start preparation for the provision of items.

In addition, in the second embodiment, the area setting memory 13 does not need to set a large area L (second range). In addition, the area setting memory 13 does not need to set any area. In this case, a preparation start time may be calculated based on reference information such as location information of the customer terminal 80 obtained upon receiving an order, the type of a customer's travel means, and item preparation time. Then, when the time has come, the customer terminal 80 may be requested for location information and thereafter location information may be continuously obtained from the customer terminal 80 and then the operation as described above may be performed. Namely, tracking of the customer terminal 80 may start based on time instead of a customer location.

Third Embodiment

A configuration of an order receiving system of the present embodiment is the same as that of an order receiving system 100 of the first embodiment shown in FIG. 1. In the present embodiment, as in the second embodiment, two areas, small and large, are set in an area setting memory 13. The present embodiment pertains to a technique for giving priority to a start of preparation for the provision of items when order information includes a plurality of types of items.

Figure 14:
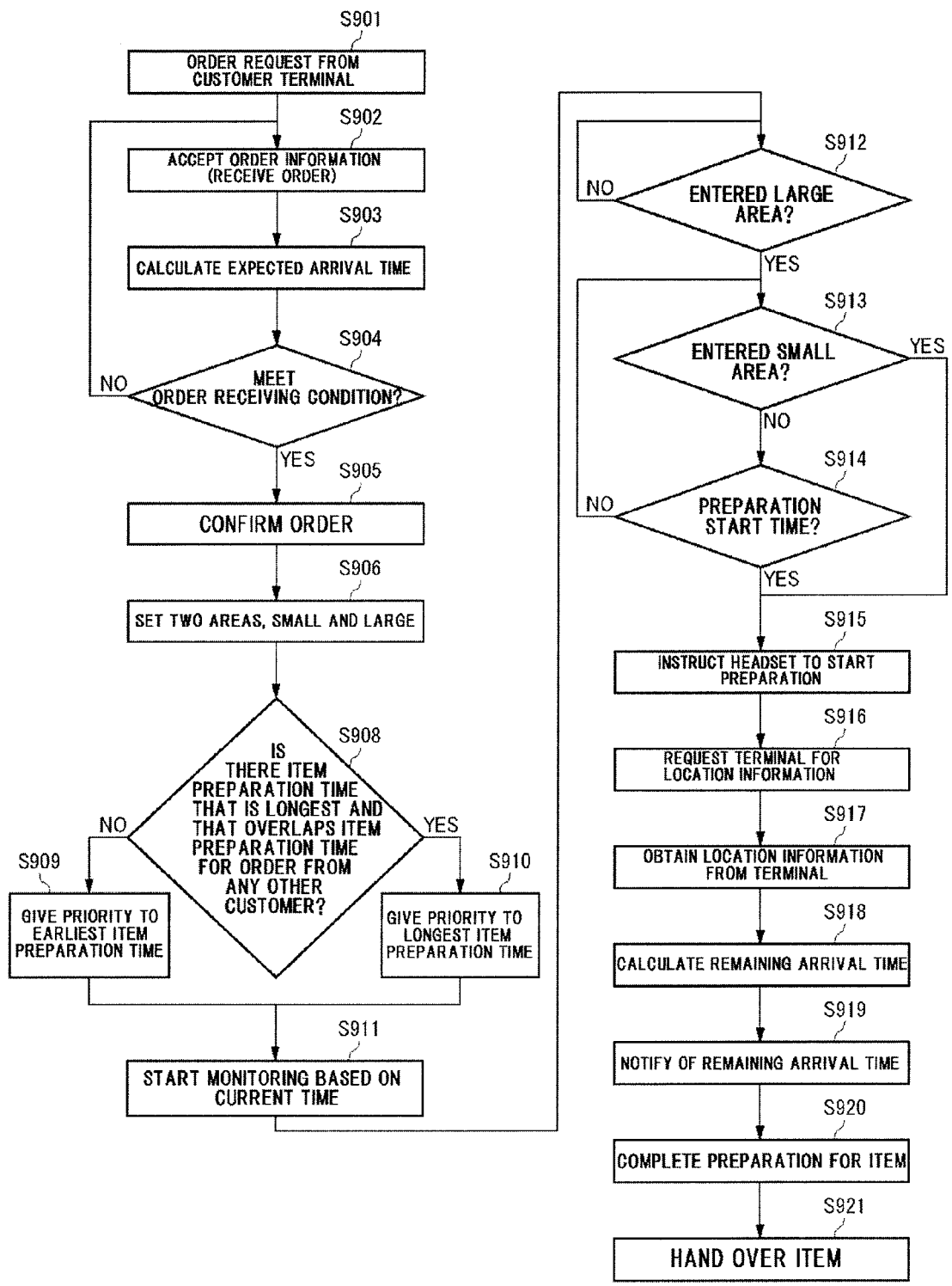
FIG. 14 is an operation flowchart of an order receiving system of a third embodiment of the present invention.

FIG. 14 is an operation flowchart of an order receiving system 100 of the present embodiment. First, an order receiving server 11 receives an order request from a customer terminal (step S901). According to this, the order receiving server 11 transmits an order screen format to the customer terminal 80. By a customer selecting items on the customer terminal 80 according to the order screen and transmitting an order, the order receiving server 11 accepts this order information (step S902).

An order control unit 22 provides the order information to an item preparation time database 25. The item preparation time database 25 calculates item preparation time based on the order information, and stores the item preparation time therein and outputs the item preparation time to the order control unit 22. Based on location information of the customer terminal 80 and location information of a store, the order control unit 22 calculates an expected arrival time at which the customer arrives at the restaurant (step S903). In addition, a timer unit 27 outputs the current time to the order control unit 22.

The order control unit 22 determines whether the order information meets an order receiving condition, based on the current time, the expected arrival time, and the item preparation time (step S904). If the order information does not meet the order receiving condition (NO at step S904), then processing returns to step S902 and order information from the customer is accepted again. If the order information meets the order receiving condition (YES at step S904), then the order is confirmed and the order information and the expected arrival time are stored in a confirmed-order storage unit 23A (step S905).

When the order is confirmed, the area setting memory 13 sets two areas, small and large, and the order receiving server 11 transmits the two areas to the customer terminal 80 (step S906). The two areas, small and large, are set based on the item preparation time and a customer's travel means, as in the second embodiment. An order display unit 50 displays the order information stored in the confirmed-order storage unit 23A (step S906).

Then, a comparison determining unit 26 determines whether there is item preparation time (i.e., the time required from the start of preparation for the provision of an item until the completion thereof) that is the longest and that overlaps item preparation time for an order (ordered item) from any other customer (step S908). If there is item preparation time that is the longest and that overlaps item preparation time for an order (ordered item) from any other customer (YES at step S908), then priority is given to the item preparation time that is the longest (step S909). If there is no such item preparation time (NO at step S908), then priority is given to item preparation time whose start of preparation time is the earliest (step S910).

Then, the comparison determining unit 26 accepts as input the current time from the timer unit 27 and starts monitoring based on the current time (step S911). Then, a location information determining unit 12 determines whether the customer terminal 80 has entered the large area L (second range), i.e., whether a notification indicating such a fact has been received from the customer terminal 80 (step S912). If the customer terminal 80 has entered the large area L (YES at step S912), then the location information determining unit 12 continuously determines whether the customer terminal 80 has entered the small area R (first range) (step S913).

If a notification indicating that the customer terminal 80 has entered the small area R set by the area setting memory 13 has been received from the customer terminal 80 (YES at step S913), then the comparison determining unit 26 outputs the order information to the order display unit 50 and an audio combining unit 28.

On the other hand, if the customer terminal 80 has not entered the small area R (first range) (NO at step S913), then the comparison determining unit 26 determines whether a preparation start time has come (step S914). If the preparation start time has not come (NO at step S914), then the comparison determining unit 26 returns to step S913 and continuously monitors whether the customer terminal 80 has entered the small area R. If the preparation start time has come (YES at step S914), then even if the customer terminal 80 has not entered the small area R, the comparison determining unit 26 outputs the order information to the order display unit 50 and the audio combining unit 28.

Note that at step S915 an order display unit F3 changes display in the same manner as in the first embodiment.

The audio combining unit 28 generates an audio signal according to the order information and outputs, as preparation start instruction information, the audio signal together with a preparation start control signal to a wireless transmitting and receiving unit 30. In the wireless transmitting and receiving unit 30, a wireless control unit 31 controls a TDMA control unit 32 based on the preparation start control signal, the TDMA control unit 32 outputs the received audio signal to a modulating and demodulating unit 33 according to the control performed by the wireless control unit 31, and an RF unit 34 transmits (distributes) the modulated audio signal, thereby instructing inter-communication equipments which are headsets 70 to start preparation (step S915). Note that at this timing a certain percentage (e.g., 20%) of the payment for the items may be charged to the order information.

When staff members at the restaurant are instructed through the headsets 70 to start preparation, they start preparation for the provision of items. Then, since the customer terminal 80 is already in the small area R at this time or the originally scheduled preparation start time has come, the order receiving server 11 continues to request the customer terminal 80 for location information (step S916) and continuously obtains location information from the customer terminal 80 (step S917). Then, the order control unit 22 calculates a customer's expected arrival time based on location information of the customer terminal 80 received by the order receiving server 11 which changes momentarily, and every time an expected arrival time is calculated, the order control unit 22 outputs the expected arrival time to the comparison determining unit 26.

Every time an expected arrival time is inputted to the comparison determining unit 26, the comparison determining unit 26 calculates remaining arrival time indicating how many minutes it takes for the customer to arrive at the restaurant, by subtracting the current time from the timer unit 27 from the expected arrival time (step S918). The comparison determining unit 26 outputs (transmits) the remaining arrival time to the order display unit 50 and the audio combining unit 26. The order display unit 50 displays the remaining arrival time together with the order information.

The audio combining unit 28 transmits, as preparation start instruction information, the generated audio signals (the audio signal for the preparation start instruction and the audio signal for the remaining arrival time) and a preparation start control signal to the wireless transmitting and receiving unit 30. The wireless transmitting and receiving unit 30 informs the headsets 70 of the audio signal for the remaining arrival time, in the same manner as in the first embodiment (step S919). The staff members at the restaurant can adjust the progress of preparation for the provision of items by hearing the remaining arrival time.

When preparation for the provision of items has been completed (step S920), the customer arrives at the restaurant after a short while. At this time, a customer's vehicle passes through the pick-up lane 104 and moves directly to the stop line 108 and moves to the item handover counter 107 according to the signal 109. A staff member at the restaurant hands over the items of the order information to the customer at the item handover counter 107 and collects the remaining charges from the customer (step S921).

According to the order receiving system of the present embodiment, if there is an order with long item preparation time, a preparation start instructing unit 20 gives priority to the order with long item preparation time and transmits preparation start instruction information to the wireless transmitting and receiving unit 30. Thus, even if there are both an item requiring a long time for preparation and an item requiring a short time for preparation, such an order can be accurately instructed to the staff members. In addition, even if an order for an item requiring a long time for preparation is received, if the preparation time for the provision of the item does not overlap that of other items, then even without giving priority to the item requiring a long time, no trouble occurs. Therefore, a process is performed (in the normal way) such that priority is given to an item whose start of preparation is the earliest.

Fourth Embodiment

A configuration of an order receiving system of the present embodiment is the same as that of an order receiving system 100 of the first embodiment shown in FIG. 1. The present embodiment pertains to a technique for efficiently preparing for ingredients at a store when the order receiving system receives a plurality of orders for the same store.

Figure 15:
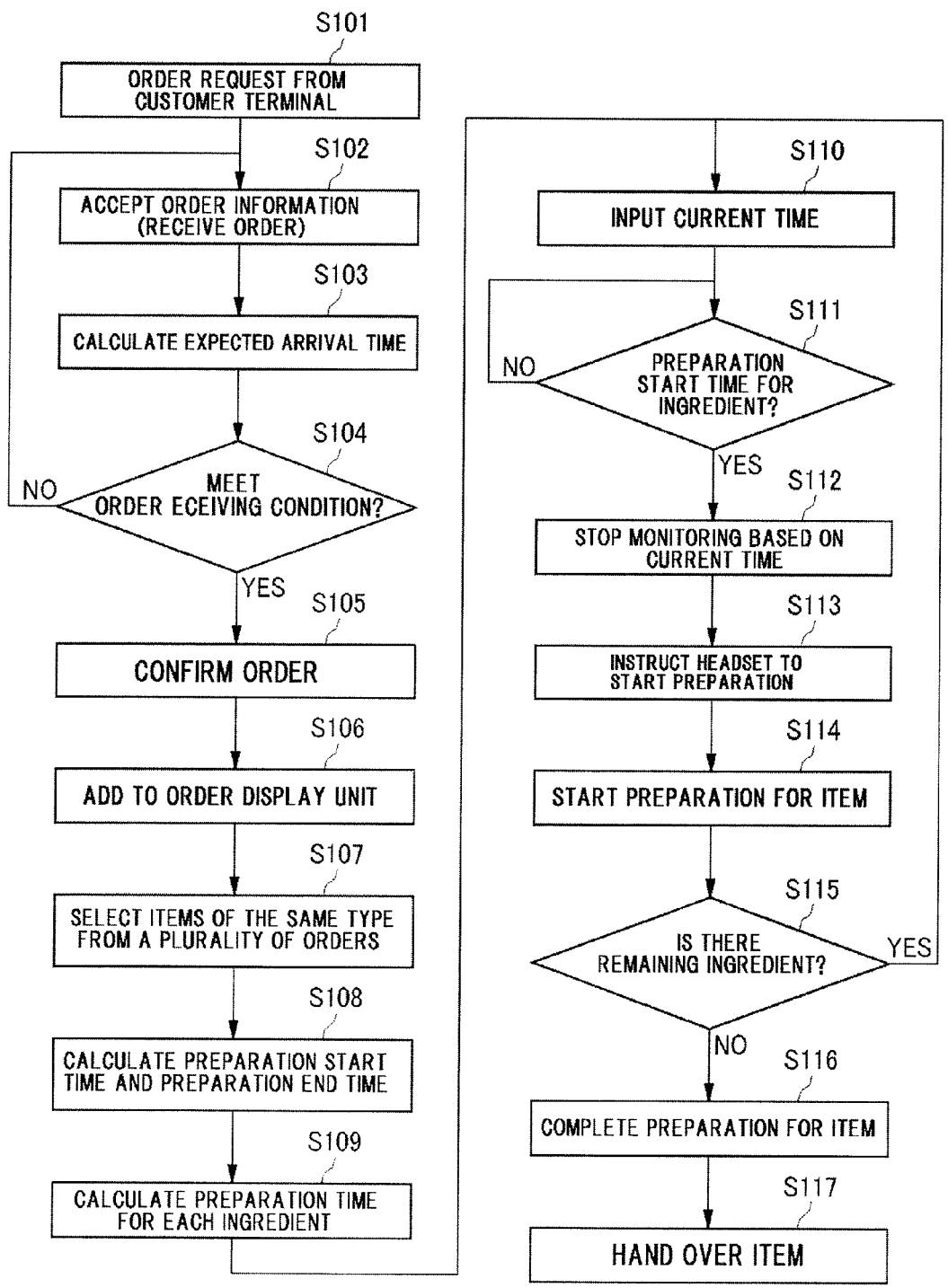
FIG. 15 is an operation flowchart of an order receiving system of a fourth embodiment of the present invention.

FIG. 15 is an operation flowchart of an order receiving system 100 of the present embodiment. First, an order receiving server 11 receives an order request from a customer terminal 80 (step S101). According to this, the order receiving server 11 transmits an order screen format to the customer terminal 80. By a customer selecting items on the customer terminal 80 according to the order screen and transmitting an order, the order receiving server 11 accepts this order information (step S102).

An order control unit 22 provides the order information to an item preparation time database 25. The item preparation time database 25 calculates item preparation time based on the order information, and stores the item preparation time therein and outputs the item preparation time to the order control unit 22. Based on location information of the customer terminal and location information of a store, the order control unit 22 calculates an expected arrival time at which the customer arrives at the restaurant (step S103). In addition, a timer unit 27 outputs the current time to the order control unit 22.

The order control unit 22 determines whether the order information meets an order receiving condition, based on the current time, the expected arrival time, and the item preparation time (step S104). If the order information does not meet the order receiving condition (NO at step S104), then processing returns to step S102 and order information from the customer is accepted again. If the order information meets the order receiving condition (YES at step S104), then the order is confirmed and the order information and the expected arrival time are stored in a confirmed-order storage unit 23A (step S105).

An order display unit 50 displays the order information stored in the confirmed-order storage unit 23A. When the order is confirmed at step S105, a newly confirmed order is added to the order display unit 50 (step S106). A comparison determining unit 26 selects items of the same type from the plurality of pieces of order information stored in the confirmed-order storage unit 23A (step S107). Then, the comparison determining unit 26 calculates, for each item of the same type, a preparation start time and a preparation end time (a time obtained by adding the time required for preparation to the preparation start time) (step S108).

Then, the comparison determining unit 26 calculates preparation time for each ingredient required for the items selected at step S107 (step S109). Ingredients required for each item are stored in the item preparation time database 25. Then, the comparison determining unit 26 accepts as input the current time from the timer unit 27 and starts monitoring based on the current time (step S110). Then, the comparison determining unit 26 compares a time obtained by subtracting the preparation time for each ingredient calculated at step S109 from the preparation end time calculated at step S108, with the current time obtained from the timer unit 27 to determine whether the current time is the time obtained by subtracting the ingredient preparation time from the preparation end time (step S111).

If the current time is the time obtained by subtracting the ingredient preparation time from the preparation end time (YES at step S111), then the comparison determining unit 26 stops the monitoring based on the current time from the timer unit 27 (step S112) and outputs the order information to the order display unit 50 and an audio combining unit 28.

The audio combining unit 28 generates an audio signal according to the order information and outputs, as preparation start instruction information, the audio signal together with a preparation start control signal to a wireless transmitting and receiving unit 30. In the wireless transmitting and receiving unit 30, a wireless control unit 31 controls a TDMA control unit 32 based on the preparation start control signal, the TDMA control unit 32 outputs the received audio signal to a modulating and demodulating unit 33 according to the control performed by the wireless control unit 31, and an RF unit 34 transmits (distributes) the modulated audio signal, thereby instructing inter-communication equipments which are headsets to start preparation (step S113).

When staff members at the restaurant are instructed through the headsets to start preparation, they start preparation for the provision of items (step S114). Note that an order display unit F3 changes display in the same manner as in the first embodiment 1.

At the restaurant, it is checked whether there is a remaining ingredient (step S115). If there is no remaining ingredient (NO at step S115), then the preparation is completed (step S116). When the customer arrives at the restaurant, a staff member at the restaurant hands over the items of the order information to the customer at the item handover counter 107 (step S117). If, after starting preparation, there is a remaining ingredient (YES at step S115), then processing returns to step S110 to allow the timer unit 27 to operate again, and whether an ingredient preparation start time has come is monitored (step S111).

Note that in the fourth embodiment, at step S103, preparation time for each ordered item may be calculated. In addition, at steps S107 and S108, preparation time for each item instead of for each order may be computed. Furthermore, at steps S109 to S112, a preparation start instruction may be performed based on shortened preparation time.

As described above, according to the order receiving system 100 of the fourth embodiment, when ordered items are prepared, items of the same type can be prepared all at once, and thus, the staff members at the restaurant can efficiently prepare the provision of items.

Note that although in the first to third embodiments, a part of the charges (20%) is charged at timing at which preparation for the provision of items starts, and the remaining charges (80%) are collected when the items are handed over, the present invention is not limited thereto. For example, cancellation of items may be accepted before starting preparation for the provision of the items, and cancellation may not be allowed (the full amount may be charged) at timing at which preparation for the provision of the items starts. In addition, at timing at which a part of the charges is added or timing after which cancellation is not accepted, such a fact may be notified to the customer terminal from the order receiving server 11.

In addition, although in the above-described embodiments, when a time obtained by adding item preparation time to the current time is beyond a customer's expected arrival time, the order control unit 22 determines that corresponding order information cannot be accepted, and thus, the order receiving server 11 transmits a notification indicating such a fact to the customer terminal to urge the customer to change the order information, the present invention is not limited. For example, when a time obtained by adding item preparation time to the current time is beyond a customer's expected arrival time, the order receiving server 11 may only call attention by transmitting to the customer terminal a message indicating that preparation for the provision of items cannot be done in time for the arrival of the customer (i.e., there is waiting time to hand over items after the customer arrives at the restaurant) and may accept corresponding order information.

Reference will be made below to the above-described plurality of embodiments. Although in the above-described embodiments an example is described in which the order receiving system 100 is applied to a quick service restaurant which provides food and drinks, the present invention is not limited thereto and, for example, targets to be provided may be services.

Although in the above-described embodiments the customer terminal 80 transmits location information to the order receiving server 11 and a time at which the customer arrives at the restaurant is predicted based on the location information, an arrival time may be inputted to the terminal 80 by the customer and transmitted to the order receiving server 11. In this case, the arrival time transmitted from the customer terminal 80 corresponds to information for determining preparation start timing.

In the above-described embodiments, instead of notifying users of headsets, i.e., staff members at a provision facility, to start preparation immediately after receiving an order from the customer terminal 80 through a communication network, a condition for starting preparation for the order is determined based on information received from the customer terminal 80 and when the condition is satisfied, an audio signal for the start of preparation is transmitted from the center module to the headsets, and thus, the staff members at the provision facility have the effect of being able to complete the preparation immediately before the customer arrives. Therefore, the order receiving system is useful as an order receiving system, etc., used by an item or service provider to receive orders from customers and prepare for and provide items or services according to the orders.

In the above-described embodiments, an order receiving system that includes a wireless center module including a transmitting unit transmitting audio signals to wireless headsets and that receives orders for items or services requiring preparation time for provision is configured such that the order receiving system includes: an order receiving unit that receives an order from a customer terminal through a communication network; an information obtaining unit that obtains, from the customer terminal, information for determining a condition for starting preparation for the order received by the order receiving unit; a start condition determining unit that determines the condition for starting preparation for the order received by the order receiving unit, based on at least the contents and information of/on the order; and a condition determining unit that determines whether the condition determined by the start condition determining unit is satisfied, and when the condition determining unit determines that the condition is satisfied, the transmitting unit of the wireless center module transmits an audio signal for the start of preparation to the wireless headsets.

According to this configuration, a customer who is not present in an item or service provision facility can order, through the communication network, an item or service requiring a long time for preparation, before arriving at the item or service provision facility. In addition, it is desirable for the provision facility to complete preparation before the customer arrives. According to the above-described configuration, instead of notifying users of the wireless headsets, i.e., staff members at the provision facility, to start preparation immediately after receiving an order from a customer terminal through the communication network, a condition for starting preparation for the order is determined based on information received from the customer terminal and when the condition is satisfied, an audio signal for the start of preparation is transmitted from the wireless center module to the wireless headsets. Thus, the staff members at the provision facility can complete the preparation immediately before the customer arrives. In addition, since the preparation start instruction to the staff members at the provision facility is an audio instruction, the staff members can receive the instruction even if they are moving around. In addition, unlike display provided on the display, the staff members do not need to be present in a specific area where they can see the display. Furthermore, a wireless headset is composed of a headset and a main body. By this, since the wireless headset is attached to the ear and head, unlike instructions from a speaker in the restaurant, the staff members do not hear instructions wrongly even in the noise.

Thus, the above-described configuration is suitably applied particularly to items and services whose too early preparation is not desirable, such as provision of food and drinks. Note that information for determining a condition for starting preparation may be, as will be described later, location information of a customer terminal or an arrival time specified by a customer. In addition, some or all of the order receiving unit, the information obtaining unit, the start condition determining unit, and the condition determining unit may be provided in an item or service provision facility, together with the wireless center module, or may be connected to the wireless center module through a communication line.

In the above-described embodiments, the condition may be that a preparation start time has come; the information for determining a condition for starting preparation for the order received by the order receiving unit may be location information of the customer terminal having placed the order at the order receiving unit; the start condition determining unit may determine a preparation start time based on at least the contents of the order and the location information; and the condition determining unit may determine whether the current time has reached the preparation start time.

According to this configuration, since a preparation start time is determined based on location information of the customer terminal, as a condition for starting preparation, preparation can start at suitable timing.

In the above-described embodiments, the condition may be that the customer terminal enters a predetermined preparation area; the information for determining a condition for starting preparation for the order received by the order receiving unit may be the contents of the order received by the order receiving unit; the start condition determining unit may determine a preparation area based on at least the contents of the order; and the condition determining unit may determine whether the customer terminal has entered the preparation area, based on information from the customer terminal.

According to this configuration, preparation can start when the customer approaches the item or service provision facility, i.e., based on the current location of the customer. Note that the above-described preparation area can be set such that by starting preparation when the customer enters the preparation area, the preparation is completed when the customer arrives at the provision facility. Specifically, the start condition determining unit calculates preparation time (the time required for bringing up of ingredients, preparation for cookware, serving, packing, etc.) based on the contents of an order, and can set a preparation area such that the time from when the customer enters the preparation area until the customer arrives at the provision facility is longer than the preparation time. Note that the preparation time may be calculated taking not only into account the contents of the order, but also the type of a customer's transportation means, traffic information before coming to the restaurant (publicly provided road traffic jam information), the level of crowdedness of customers in the restaurant, a time zone of the ordered date, the number of vehicles waiting in the lane, the number of staff members on that day, etc. In addition, when there are a plurality of items or services of the same type whose preparation starts simultaneously, the preparation time may be determined taking into account time shortened by all-at-once preparation.

In the above-described embodiments, the condition may be that a preparation start time has come and the customer terminal has entered a predetermined preparation area; the information for determining a condition for starting preparation for the order received by the order receiving unit may be location information of the customer terminal having placed the order at the order receiving unit and the contents of the order received by the order receiving unit; the start condition determining unit may determine a preparation start time based on at least the contents of the order and the location information and may determine a preparation start time and a preparation area based on at least the contents of the order; and the condition determining unit may determine whether the current time has reached the preparation start time and may determine whether the customer terminal has entered the preparation area, based on information from the customer terminal.

According to this configuration, since preparation can start when a preparation start time has come and the customer approaches the item or service provision facility, preparation can start at more suitable timing.

In the above-described embodiments, a preparation area transmitting unit that transmits information indicating a preparation area to the customer terminal may be further provided, and the condition determining unit may obtain location information of the customer terminal, based on information transmitted according to the fact that the customer terminal which monitors whether the customer terminal has entered the preparation area has entered the preparation area.

According to this configuration, since the order receiving system transmits information indicating a preparation area to the customer terminal, the customer terminal can determine, using the information on the preparation area, whether the customer terminal has entered the preparation area. Then, when the customer terminal has entered the preparation area, the customer terminal transmits information indicating such a fact to the order receiving system. By thus receiving, when the customer terminal has entered the set preparation area, information indicating such a fact from the customer terminal, instead of continuously obtaining location information from the customer terminal immediately after receiving an order, the customer terminal does not need to continuously transmit location information to the order receiving system in a location relatively far in distance from the provision facility, enabling to suppress the power consumption of the customer terminal. In addition, customer privacy is protected.

In the above-described embodiments, there may be further provided a tracking area transmitting unit that transmits information indicating a tracking area to the customer terminal; and a location information obtaining unit that continuously obtains location information from the customer terminal after receiving information transmitted according to the fact that the customer terminal which monitors whether the customer terminal has entered the tracking area has entered the tracking area. The transmitting unit of the wireless center module may transmit to the wireless headsets an audio signal indicating a customer's arrival time or a customer location which is determined based on the location information obtained by the location information obtaining unit.

According to this configuration, after the customer approaches the provision facility, the staff members at the provision facility can continuously know a customer's arrival time or location. Note that the transmitting unit of the wireless center module can transmit to the wireless headsets an audio signal such as "customer is coming in three minutes" or "customer is coming in one minute". In addition, since tracking where customer's location information is continuously received starts after the customer terminal has entered the tracking area, customer privacy is protected outside the tracking area. Note that the tracking area is the same as the above-described preparation area and a determination as to whether the customer terminal has entered the tracking area may be namely a determination as to whether the customer terminal has entered the preparation area.

In the above-described embodiments, when the condition determining unit determines that the condition is satisfied, the condition determining unit may charge a part of the payment for the item or service.

According to this configuration, the possibility of changes to the order after coming to the restaurant or of order cancellation is reduced and the customer does not need to make a 100% purchase commitment at the time of ordering, which leads to promotion of use of the order receiving system.

In the above-described embodiments, when the condition determining unit determines that the condition is satisfied, the transmitting unit of the wireless center module may first transmit an audio signal for a notification sound to the wireless headsets and may transmit, in response to a request from a wireless headset, an audio signal for the start of preparation to the wireless headset.

According to this configuration, the staff members at the item or service provision facility can know, by a notification sound, the presence of an audio signal for the start of preparation, and can receive and hear the audio signal for the start of preparation at their convenient timing. For example, when a staff member cannot hear the content of audio for the start of preparation in a crowd, he/she can receive and hear an audio signal for the start of preparation after it gets relatively quiet, which enables to circumvent a situation where he/she cannot hear audio for the start of preparation, and to accurately provide instructions to the staff members.

In the above-described embodiments, a wireless headset may be allowed for telephone conversations with other wireless headsets through the wireless center module; telephone conversations between wireless headsets may have, as a telephone conversation mode, a page mode which is mainly used for business communication and a talk mode which is mainly used to receive orders through talks; and in the case in which the condition determining unit determines that the condition is satisfied, when the telephone conversation mode is the talk mode, the transmitting unit of the wireless center module may transmit an audio signal for a notification sound to a wireless headset and may transmit, in response to a request from a wireless headset, an audio signal for the start of preparation to the wireless headset.

According to this configuration, when a staff member at the item or service provision facility is in the talk mode, i.e., while serving customers, he/she can know, by a notification sound, the presence of an audio signal for the start of preparation, and can receive and hear the audio signal for the start of preparation when the serving is done. This enables to prevent the staff member from missing hearing the content of the start of preparation due to serving of customers. Thus, the start of preparation can be accurately instructed to the staff member and audio for the start of preparation does not disturb the serving of customers. Note that the notification sound may be a beep sound.

In the above-described embodiments, a storage unit that stores preparation time for each type of item or service is provided, and preparation time may be determined for each type of item or service included in the order received by the order receiving unit, by referring to the storage unit; the condition determining unit may determine whether the current time has reached a preparation start time, for each type of item or service included in the order received by the order receiving unit; and when preparation time for an item or service with long preparation time from a preparation start time for the item or service overlaps preparation time for any other item or service from a preparation start time for any other item or service, the transmitting unit of the wireless center module may transmit to the wireless headsets an audio signal for the start of preparation for the item or service with long preparation time on a priority basis.

According to this configuration, even if there are both an item or service requiring a long time for preparation and an item or service not requiring a long time for preparation, the staff members at the provision facility can be accurately reminded of the start of preparation. Note that even if an order for an item or service requiring a long time for preparation is received, if the preparation time zone for the item or service does not overlap the preparation time zone for other items or services, then even without giving priority to the start of preparation for the item or service requiring a long time for preparation, no trouble occurs.

In the above-described embodiments, when the order receiving unit receives a plurality of orders, the condition determining unit may determine for each type of item or service included in the plurality of orders whether the current time has reached a preparation start time; and for a plurality of items or services of the same type, when the earliest preparation start time has come, the transmitting unit of the wireless center module may transmit to the wireless headsets an audio signal for the start of preparation for starting preparation for the items or services of the type.

According to this configuration, preparation for items or services of the same type in a plurality of orders can be performed all at once and thus preparation for the items or services can be efficiently performed. In addition, preparation for elements such as ingredients and materials required for preparation for items or services of the same type in a plurality of orders (e.g., when the items are food and drinks, preparation such as bringing ingredients from a kitchen, i.e., pre-arrangement) can be performed all at once for the plurality of orders. Thus, the number of prearrangements such as bringing up of elements can be reduced, enabling to make staff members' work efficient. In addition, even before a preparation start time, the transmitting unit of the wireless center module may transmit, in response to a request from a wireless headset, an audio signal indicating the number of orders in process or the number of elements in process (e.g., elements to be brought from a storage and the numbers of the elements) to the wireless headset.

In addition, the wireless center module of the above-described embodiments is a wireless center module that transmits an audio signal to wireless headsets and mediates telephone conversations between a plurality of wireless headsets. The wireless center module is configured such that telephone conversations between wireless headsets have, as a telephone conversation mode, a page mode which is mainly used for business communication and a talk mode which is mainly used to receive orders through talks, and when the telephone conversation mode is the talk mode, the transmitting unit of the wireless center module transmits an audio signal for a notification sound to a wireless headset and transmits, in response to a request from a wireless headset, an audio signal for the start of preparation to the wireless headset. Here, the audio signal for the start of preparation is an audio signal indicating at least the type and number of ordered items or services in order to start preparation for an item or service requiring preparation time for provision, and the audio signal for a notification sound is an audio signal notifying the reception of the start of preparation.

By this configuration, too, instead of notifying users of the wireless headsets, i.e., the staff members at the provision facility, to start preparation immediately after receiving an order from a customer terminal through the communication network, a condition for starting preparation for the order is determined based on information received from the customer terminal and when the condition is satisfied, an audio signal for the start of preparation is transmitted to the wireless headsets. Thus, the staff members at the provision facility can complete the preparation immediately before the customer arrives.

An order receiving method of the above-described embodiments is for an order receiving system that includes a wireless center module including a transmitting unit transmitting an audio signal to wireless headsets and that receives orders for items or services requiring preparation time for provision. The order receiving method is configured to include: an order receiving step of receiving an order from a customer terminal through a communication network; an information obtaining step of obtaining, from the customer terminal, information for determining a condition for starting preparation for the order received in the order receiving step; a start condition calculation step of determining the condition for starting preparation for the order received in the order receiving step, based on at least the contents and information of/on the order; a condition determining step of determining whether the condition determined in the start condition calculation step is satisfied; and a reminding step of transmitting an audio signal for the start of preparation to the wireless headsets from the transmitting unit of the wireless center module, when it is determined in the condition determining step that the condition is satisfied.

By this configuration, too, instead of notifying users of the wireless headsets, i.e., staff members at a provision facility, to start preparation immediately after receiving an order from a customer terminal through the communication network, a condition for starting preparation for the order is determined based on information received from the customer terminal and when the condition is satisfied, an audio signal for the start of preparation is transmitted from the wireless center module to the wireless headsets. Thus, the staff members at the provision facility can complete the preparation immediately before the customer arrives.

While there has been described what is considered at the present time to be the preferred embodiments of the present invention, it will be understood that various modifications may be made therein without departing from the true spirit and scope of the present invention and it is intended to cover in the appended claims all such modifications.

What is claimed is:

1. An order receiving system that receives an order for an item requiring preparation time for provision, the order including an onsite order received from an operator at a site where the item is utilized and a remote order received over a public communication network, the order receiving system supporting start of preparation of items both in the onsite order and the remote order, comprising:
    a receiver that receives the remote order for the item from a customer terminal, which is connected to the order receiving system via the public communication network, and reference information, which determines a condition for starting preparation of the remote order, from the customer terminal;
    an input device provided at the site that receives the onsite order that is input by the operator at the site;
    a storage that stores the remote order and the input onsite order;
    a display that includes a remote order display area, in which the remote order is displayed and the input onsite order is not displayed, and an onsite order display area, in which both the remote order and the input onsite order are displayed; and
    an order manager that
    displays the input onsite order, input via the input device, in the onsite order display area on the display;
    displays the remote order, received by the receiver over the public communication network, in the remote order display area on the display;
    sets the condition for starting preparation of the remote order, based on the remote order and the reference information;
    determines, after receiving the remote order by the receiver, whether the set condition is satisfied for the remote order;
    changes an area on which the remote order is displayed from the remote order display area to the onsite order display area on the display, when it is determined that the set condition is satisfied for the remote order; and
    prohibits the remote order from being canceled, when the area on which the remote order is displayed is changed from the remote order display area to the onsite order display area on the display.

2. The order receiving system according to claim 1, wherein the order manager changes the remote order displayed on the onsite order display area, in a different display mode from a display mode of the input onsite order received by the input device.

3. The order receiving system according to claim 1, wherein
    the condition comprises arrival of a beginning of a preparation start time for providing the item of the remote order,
    the reference information comprises location information of the customer terminal having placed the remote order,
    the order manager calculates the preparation start time based on a content of the remote order received by the receiver and the location information, and
    the order manager determines whether a current time has reached the preparation start time.

4. The order receiving system according to claim 1, wherein
    the condition comprises that the customer terminal has reached a predetermined preparation area,
    the reference information comprises a content of the remote order received by the receiver and location information of the customer terminal having placed the remote order,
    the order manager sets the preparation area based on the content of the remote order received by the receiver, and
    the order manager determines whether the customer terminal has entered the preparation area, based on the location information of the customer terminal.

5. The order receiving system according to claim 1, wherein the display does not display the onsite order input via the input device, in the remote order display area.

6. The order receiving system according to claim 1, further comprising:
a headset; and
a transmitter that transmits a signal, instructing starting preparation of the item of the remote order, to the headset, when it is determined that the set condition is satisfied.

7. The order receiving system according to claim 1, further comprising:
a headset including a speaker; and
a transmitter that transmits a beep sound to the headset, when it is determined that the set condition is satisfied,
wherein the speaker of the headset outputs the beep sound when the beep sound is received from the transmitter.

8. The order receiving system according to claim 7, wherein the headset includes a lamp, and the headset turns the lamp on and off, when the beep sound is received from the transmitter.

9. The order receiving system according to claim 1, wherein the remote order is prohibited to be canceled by charging full amount of payment.

10. The order receiving system according to claim 1, wherein
when the receiver receives the remote order, the order manager calculates a preparation start time based on the remote order, sets a preparation area, the preparation area indicating an area that allows preparation of the item of the remote order to be completed immediately before an arrival of the customer if the preparation of the item of the remote order starts when the customer terminal enters the preparation area,
the order receiving system further includes a transmitter that transmits the information on the preparation area to the customer terminal, to enable the customer terminal to monitor whether the customer terminal has entered the preparation area and to transmit a notification indicating that the customer terminal has entered the preparation area as a result of the monitoring,
the order manager determines whether a current time reaches the preparation start time,
after it is determined that the current time reaches the preparation time, the order manager determines whether the receiver has received the notification indicating that the customer terminal has entered the preparation area,
when it is determined that the notification has been received by the receiver, the order manager changes the area on which the remote order is displayed from the remote order display area to the onsite order display area.

11. The order receiving system according to claim 1, wherein
when the receiver receives the remote order, the order manager calculates a preparation start time based on the remote order, sets a first area and a second area, the first area indicating a preparation area that allows preparation of the item of the remote order to be completed immediately before an arrival of the customer if the preparation of the item of the remote order starts when the customer terminal enters the preparation area, the second area being greater than the first area,
the order receiving system further includes a transmitter that transmits information on the first area and the second area to the customer terminal, to enable the customer terminal to enable the customer terminal to monitor whether the customer terminal has entered the first and second areas, and to transmit notifications indicating that the customer terminal enters the first area and the second area based on the monitoring;
the order manager determines whether the customer terminal enters the second area, and then determines whether the customer terminal enters the first area, based on the notifications transmitted from the customer terminal;
when the order manager determines that the customer terminal enters the first area, the transmitter transmits a request to the customer terminal to enable the customer terminal to continuously transmit a position of the customer terminal to the order receiving system, and the order manager changes the area on which the remote order is displayed from the remote order display area to the onsite order display area on the display.

12. The order receiving system according to claim 1, wherein the remote order is not moved from the onsite order display area to the remote order display area, and the input onsite order is not moved from the onsite order display area to the remote order display area.

13. An order receiving method that receives an order for an item requiring preparation time for provision, the order including an onsite order received from an operator at a site where the item is utilized and a remote order received over a public communication network,
the order receiving method supporting start of preparation of items both in the onsite order and the remote order, the order receiving method, performed by a processor, comprising:
inputting an onsite order into a storage by the operator at the site via an input device provided at the site;
displaying the input onsite order in an onsite order display area on a display, the onsite order display area configured to display both the onsite order and the remote order;
receiving the remote order from a customer terminal by a receiver via the public communication network;
storing the received remote order into the storage;
displaying the remote order in a remote order display area on the display, the remote order display displaying the remote order and not displaying the onsite order;
receiving, by the receiver, reference information, which determines a condition for starting preparation of the remote order, from the customer terminal via the public communication network;
setting the condition for starting preparation of the remote order, based on the remote order and the reference information;
determining, after receiving the remote order by the receiver, whether the set condition is satisfied for the remote order;
changing an area on which the remote order is displayed from the remote order display area to the onsite order display area on the display, when it is determined that the set condition is satisfied for the remote order; and
prohibiting the remote order from being canceled, when the area on which the remote order is displayed is changed from the remote order display area to the onsite order display area on the display.

14. The order receiving method according to claim 13, wherein the remote order displayed on the onsite order display area is displayed in a different display mode from a display mode of the onsite order input via the input device.

15. An order receiving system that receives an order for an item requiring preparation time for provision, the order including an onsite order received from an operator at a site where the item is utilized and a remote order received over a public communication network, the order receiving system supporting start of preparation of items both in the onsite order and the remote order, comprising:
- a receiver that receives the remote order for the item from a customer terminal, which is connected to the order receiving system via the public communication network, and reference information, which determines a condition for starting preparation of the remote order, from the customer terminal;
- an input device provided at the site that receives the onsite order that is input by the operator at the site;
- a storage that stores the remote order and the input onsite order;
- a display that includes a remote order display area, in which the remote order is displayed and the input onsite order is not displayed, and an onsite order display area, in which both the remote order and the input onsite order are displayed; and
- an order manager that:
- displays the input onsite order, input via the input device, in the onsite order display area on the display;
- displays the remote order, received by the receiver over the public communication network, in the remote order display area on the display;
- sets the condition for starting preparation of the remote order, based on the remote order and the reference information;
- determines, after receiving the remote order by the receiver, whether the set condition is satisfied for the remote order;
- changes an area on which the remote order is displayed from the remote order display area to the onsite order display area, when it is determined that the set condition is satisfied for the remote order; and
- charges a portion of payment for the remote order, when the area on which the remote order is displayed is changed from the remote order display area to the onsite order display area on the display.

16. The order receiving system according to claim 15, further comprising a completion input device that receives an input indicating a completion of a handover of the item of the remote order, and
wherein the order manager charges a full amount of the payment for the remote order, when the completion input device receives an input indicating a completion of a handover of the item of the remote order.

17. The order receiving system according to claim 15, wherein
when the receiver receives the remote order, the order manager calculates a preparation start time based on the remote order, sets a preparation area, the preparation area being an area that allows preparation of the item of the remote order to be completed immediately before an arrival of the customer if the preparation of the item of the remote order starts when the customer terminal enters the preparation area, the order receiving system further includes a transmitter that transmits information on the preparation area to the customer terminal, to enable the customer terminal to monitor whether the customer terminal has entered the preparation area and to transmit a notification indicating that the customer terminal has entered the preparation area as a result of the monitoring,
the order manager determines whether a current time reaches the preparation start time,
after it is determined that the current time reaches the preparation time, the order manager determines whether the receiver has received the notification indicating that the customer terminal has entered the preparation area,
when it is determined that the notification has been received by the receiver, the order manager changes the area on which the remote order is displayed from the remote order display area to the onsite order display area on the display.

18. An order receiving method that receives an order for an item requiring preparation time for provision, the order including an onsite order received from an operator at a site where the item is utilized and a remote order received over a public communication network,
the order receiving method supporting start of preparation of items both in the onsite order and the remote order, the order receiving method, performed by a processor, comprising:
- inputting an onsite order into a storage by the operator at the site via an input device provided at the site;
- displaying the input onsite order in an onsite order display area on a display, the onsite order display area configured to display both the onsite order and the remote order;
- receiving the remote order from a customer terminal by a receiver via the public communication network;
- storing the received remote order into the storage;
- displaying the remote order in a remote order display area on the display, the remote order display area displaying the remote order and not displaying the onsite order;
- receiving, by the receiver, reference information, which determines a condition for starting preparation of the remote order, from the customer terminal via the public communication network;
- setting the condition for starting preparation of the remote order, based on the remote order and the reference information;
- determining, after receiving the remote order by the receiver, whether the set condition is satisfied for the remote order;
- changing an area on which the remote order is displayed from the remote order display area to the onsite order display area on the display, when it is determined that the set condition is satisfied for the remote order; and
- charging a portion of payment for the remote order, when the area on which the remote order is displayed is changed from the remote order display area to the onsite order display area on the display.

* * * * *